14
13
23
B
L
25
22
21
24
28
188
187
152
150
12
12A
10
10A
15
15A
16
17
17A
76
76A
81
57
57A
20
S
18
18A
39
39A
19
19A 167
165
169
166
195
18
39
S
145
25
140
198
148
197
32
81
199
76
33,35
34
42
18A
38
133
112
152
151
181
183
184
182
L
174
175
178
81A
76A
199A
170
186
185
192
L

United States Patent Office

Re. 27,165
Reissued Aug. 10, 1971

27,165

TUFTING APPARATUS FOR THE MANUFACTURE OF CARPETS, RUGS, AND THE LIKE

Abram N. Spanel, 344 Stockton St., Princeton, N.J. 08540, and Loy E. Barton, Bradenton, Fla.; said Barton assignor to said Spanel Original No. 3,387,577, dated June 11, 1968, Ser. No. 503,342, Oct. 23, 1965. Application for reissue Sept. 17, 1969, Ser. No. 866,416
Int. Cl. D05c *15/16*
U.S. Cl. 112—79 38 Claims

Matter enclosed in heavy brackets [ ] appears in the original patent but forms no part of this reissue specification; matter printed in italics indicates the additions made by reissue.

ABSTRACT OF THE DISCLOSURE

Yarn bits are cut from yarn strands and *pneumatically* transported [by suction] to bit-loading stations where they are positioned by stop means for transfer to a backing layer by bit-applying elements as provided by needles, narrow blunt-edged blades, or a single [wide] blunt-edged blade.

This invention relates to mechanisms and methods for manufacturing carpets, rugs, pile textiles and the like by application of yarn-bits to a backing layer in location and color to reproduce any desired pattern.

In accordance with the present invention, the bit-applying elements of a tufting machine (specifically the needles, for example), are supplied in each cycle of the machine with yarn-bits of color and position, to reproduce the corresponding line of a desired pattern by a pneumatic transmission arranged specifically comprising at least one pair of associated guide and magazine structures. Each magazine structure has an array of passages respectively forming part of a path for pneumatic transmission of a yarn-bit to a corresponding needle or other bit-applying element. Each guide structure or means for receiving the ends of yarn strands has an array of similarly spaced passages for threading, in a repeated color sequence, with the yarn strands; the number of colors in each sequence should be not less than, and is preferably equal to, the total number of colors required by all lines of the pattern. The number of yarn passages, per guide structure, should preferably exceed the number of needles to be supplied therefrom to accommodate an additional color sequence of yarn strands.

During a cycle of the machine as used for two or more color operation, each passage of the magazine effectively scans, step-by-step, a complete color sequence of the guide-structure passages. For each step position of the scan, the magazine passages are each in alignment with a guide-passage corresponding with that step position and independent feed-means for the yarn strands are selectively controllable in accordance with patern requirements so that one or more or none of the magazine passages receive a yarn end fed from the ten aligned guide passage. In the interval between successive scan steps and after the time for operation of the feed-means, all yarn strands then extending between the guide and magazine structures are severed, as by timed knife means, so to leave yarn-bits of selected color in predetermined passages of the magazine.

During the machine-cycle, the yarn bits are transferred from the magazine by pneumatic means applied to bit transfer tubes, each having a receiving end aligned with a magazine passage and a discharge end adjacent the bit-loading position of the corresponding bit-applying element. In one arrangement using needles for applying the bits, the yarn-bits are centered, as by reciprocable pneumatic stops before movement of the needles from loading position and a shutter valve normally sealing a vacuum-manifold for the discharge ends of the transfer tubes is retracted to permit passage of the loaded needles from their loading position, through the backing layer, and then back to loading position. In another arrangement using needles for applying the yarn-bits, the eye ends of the empty needles pass through the backing layer to the bit-loading position, and after loading are returned through the backing layer for transfer of the bits thereto.

The invention further resides in a tufting machine having features of construction, combination and arrangement hereinafter described and claimed.

For a more detailed understanding of the invention, reference is made to the following description of preferred methods and apparatus and to the accompanying drawings in which.

Figures 1, 1A, 1B:
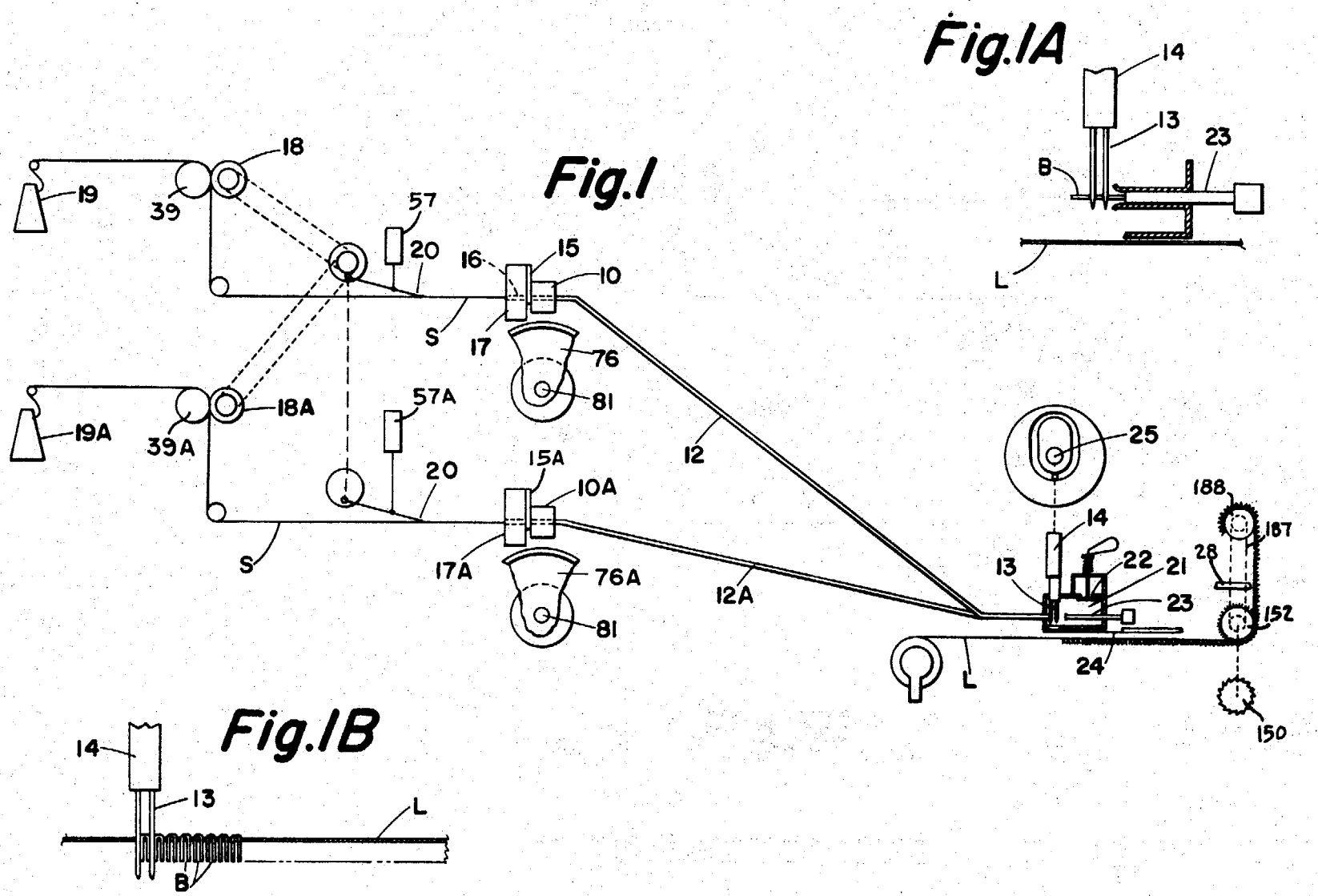
FIG. 1 is a flow diagram illustrating the yarn and backing-layer paths and identifying components of the preferred apparatus.
FIGS. 1A and 1B are explanatory figures referred to in discussion of the tufting operation.
Figure 2:
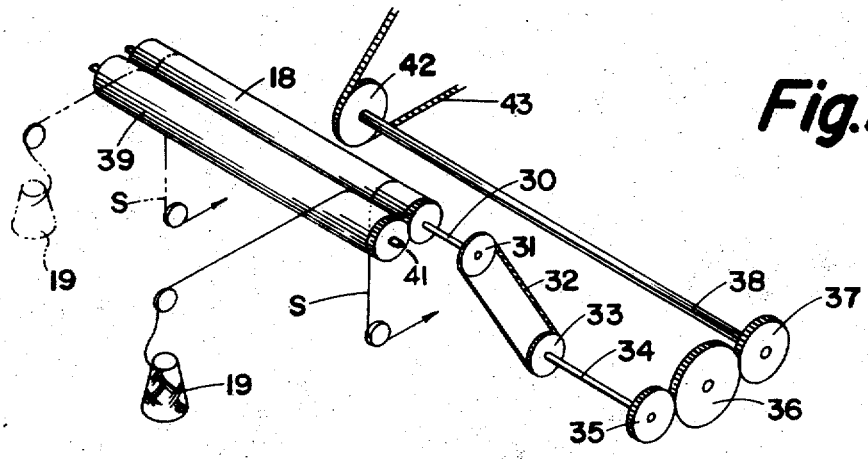
Figure 3:
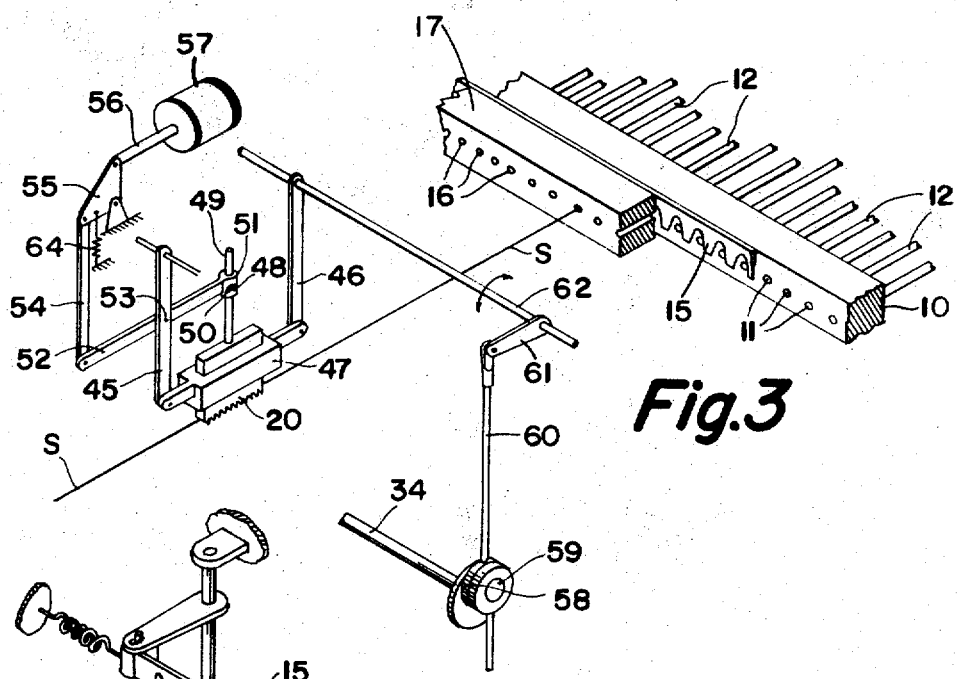
Figure 4:
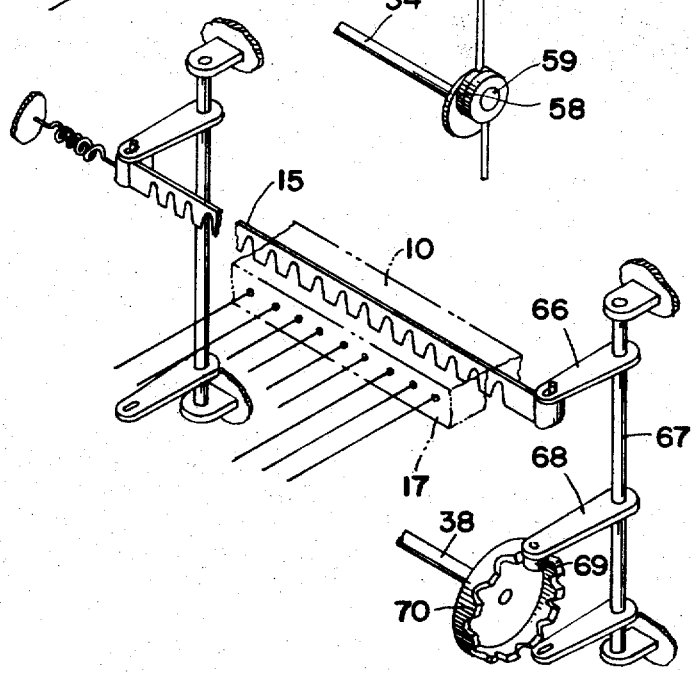
Figure 5:
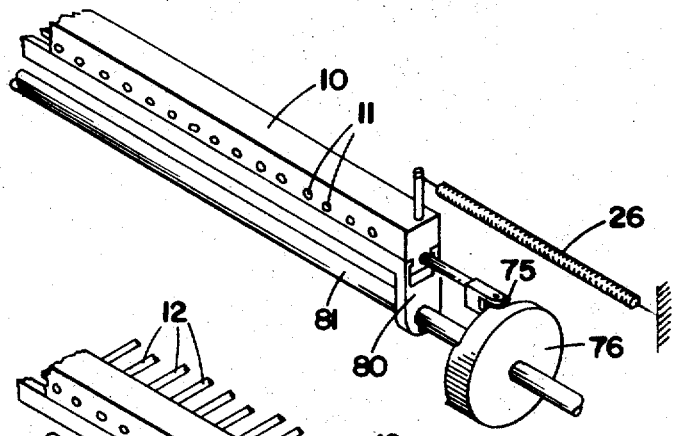
Figure 6:
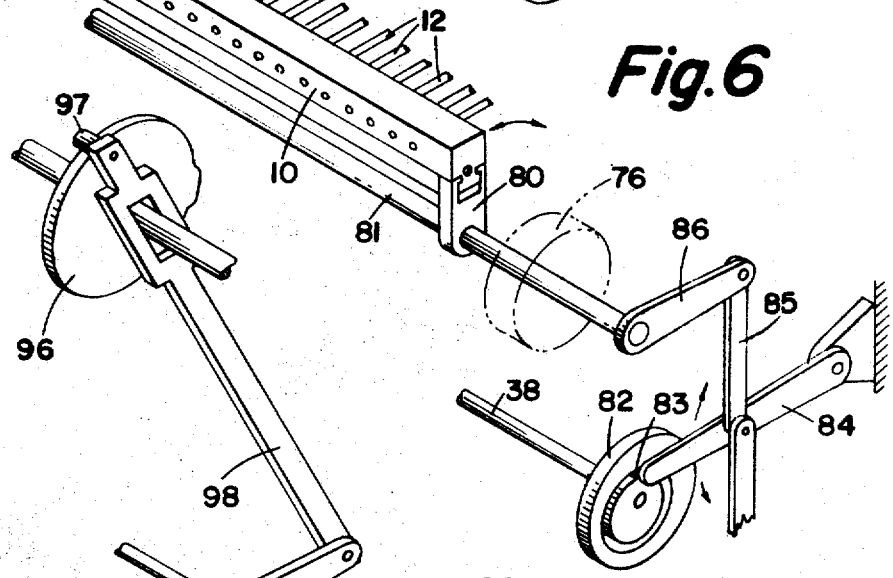
Figure 7:
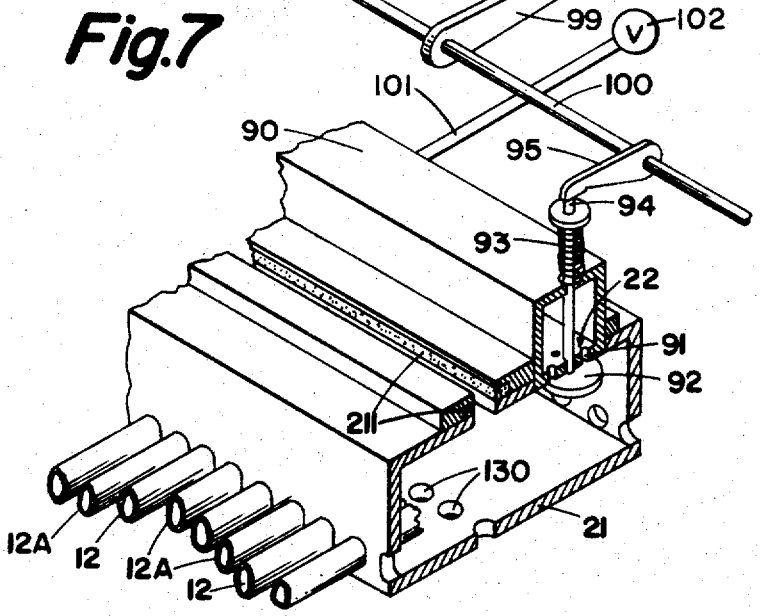
Figure 8:
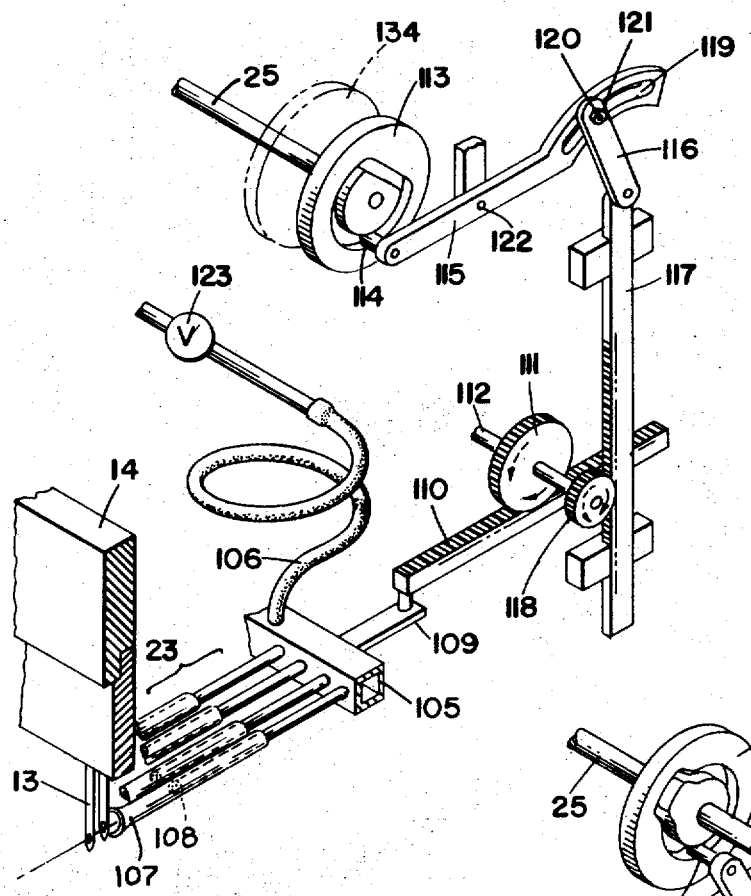
Figure 9:
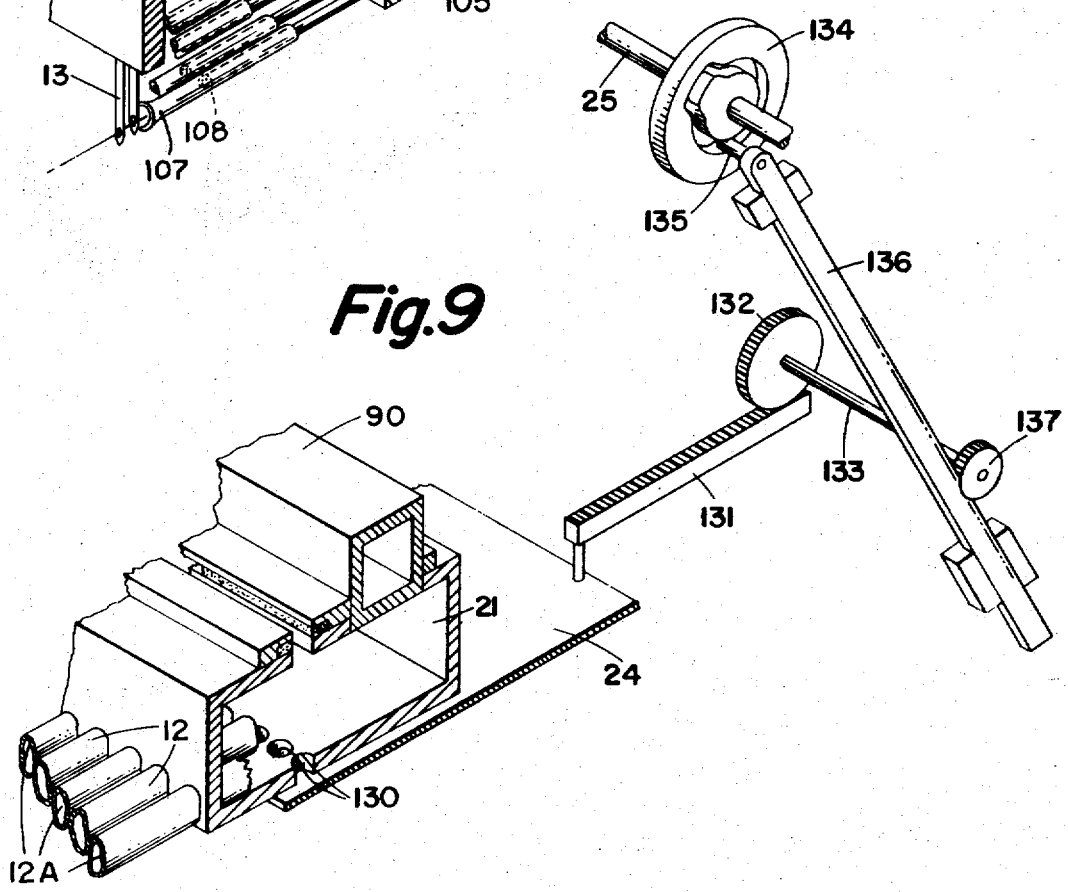
Figure 10:
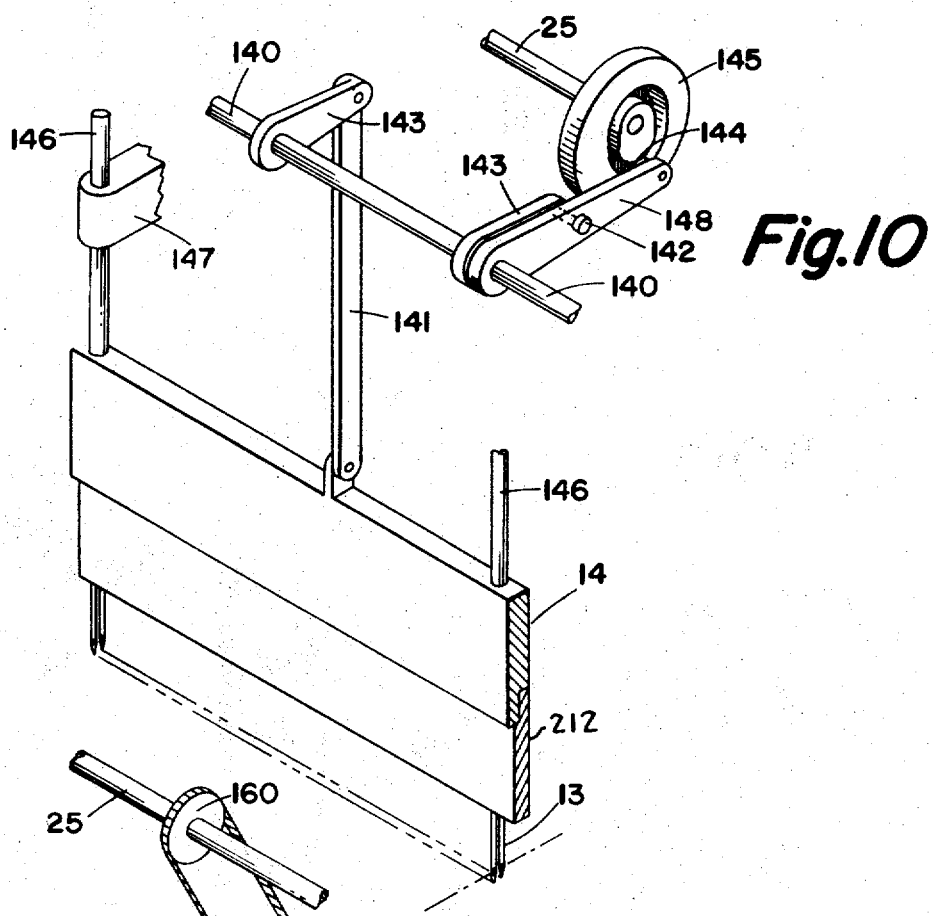
Figure 11:
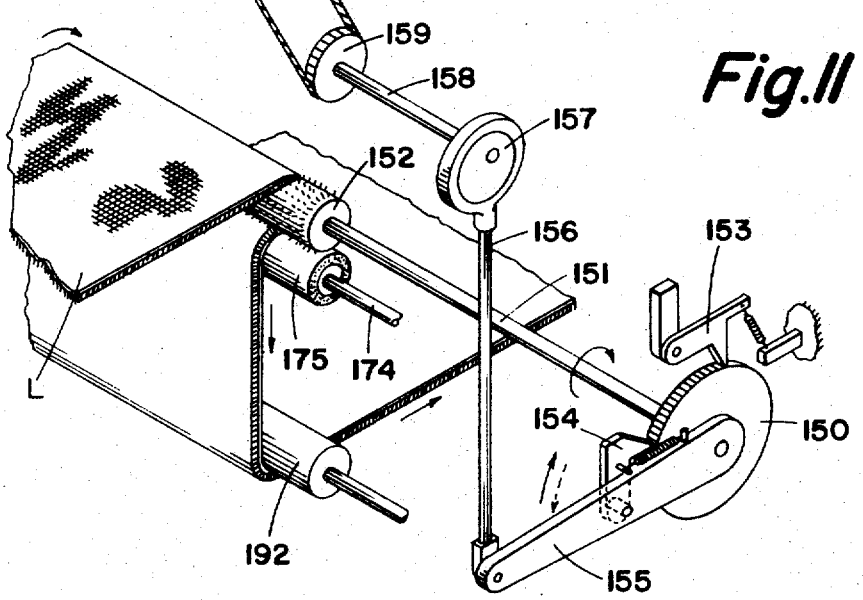
Figure 12A:
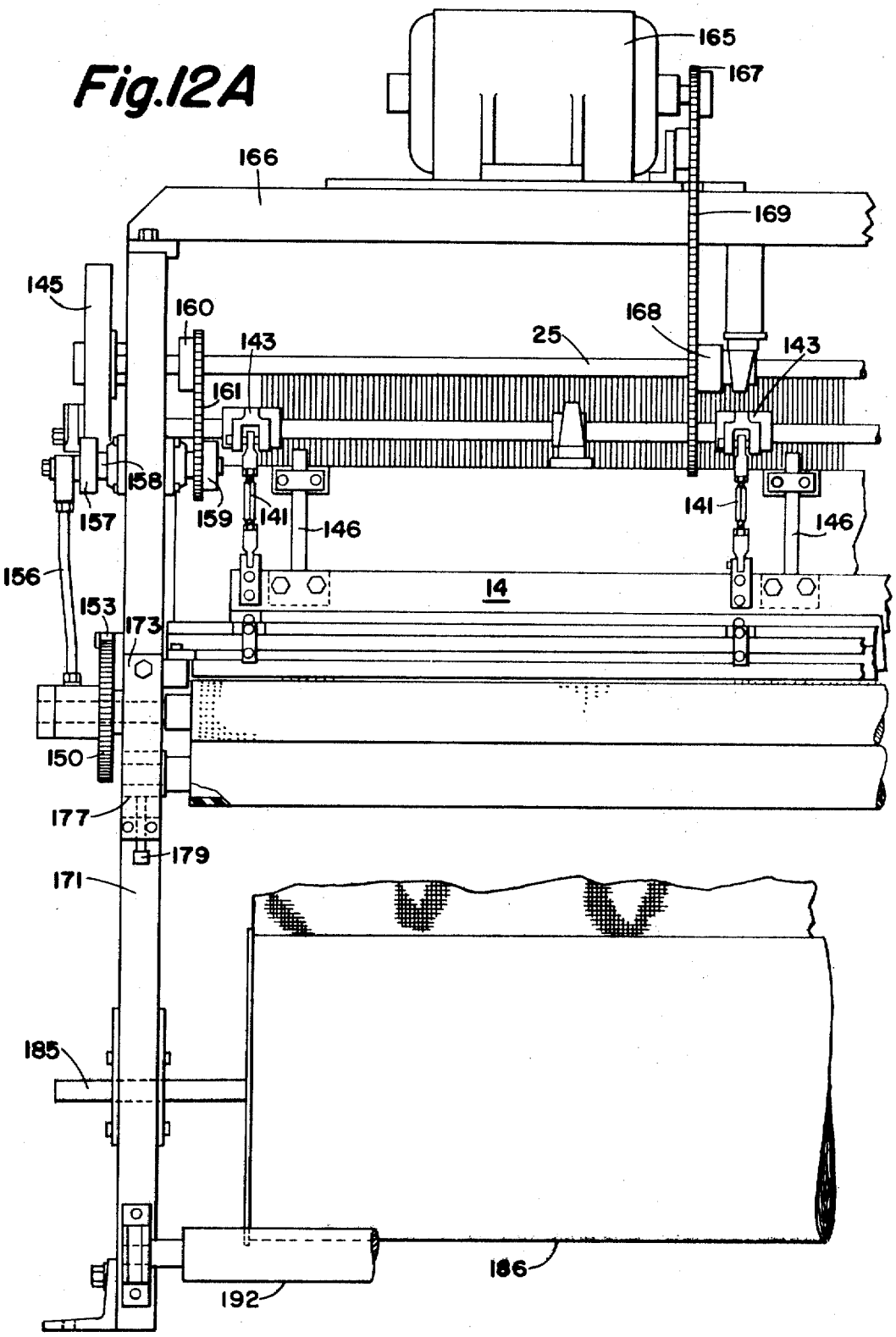
Figure 12B:
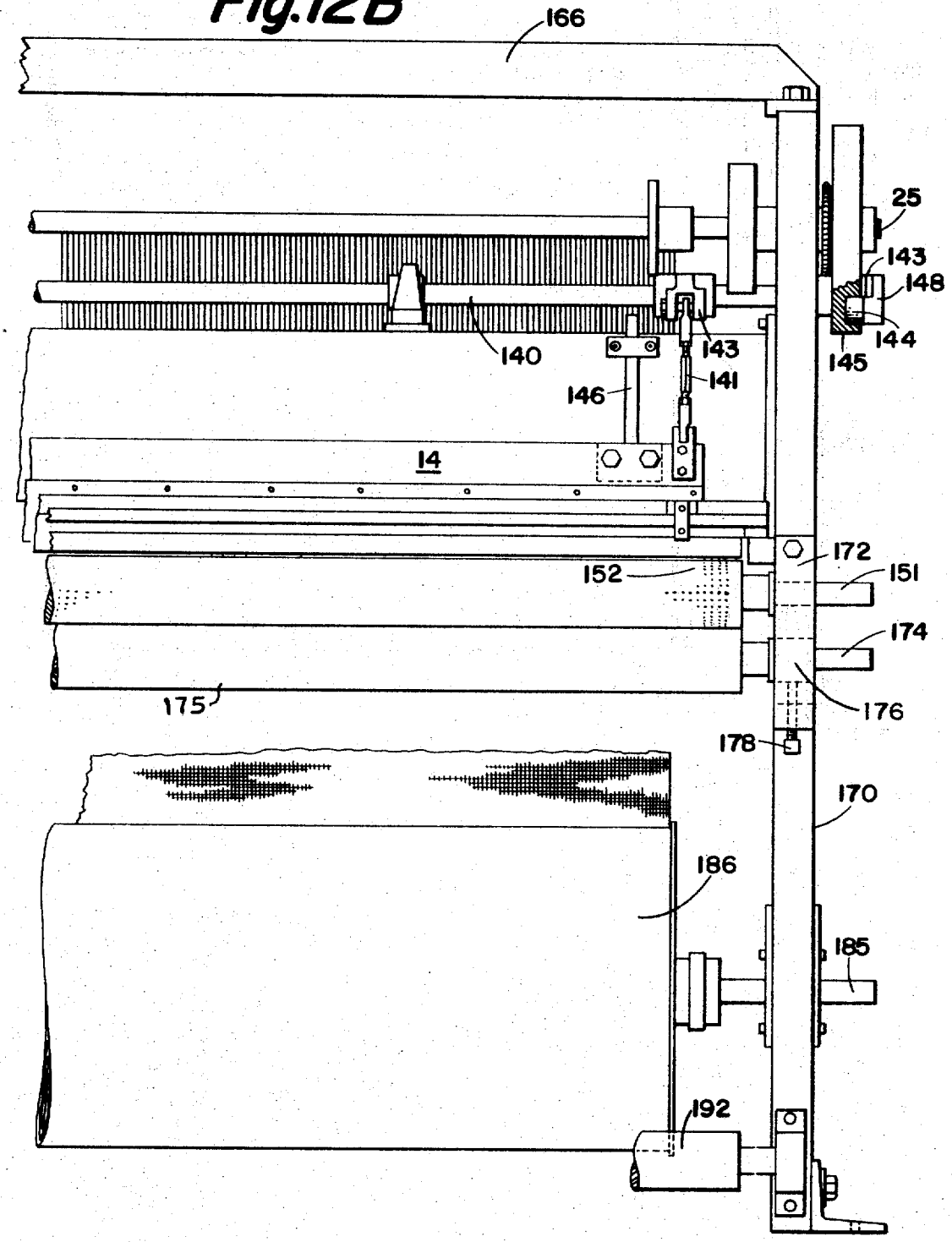
Figure 13:
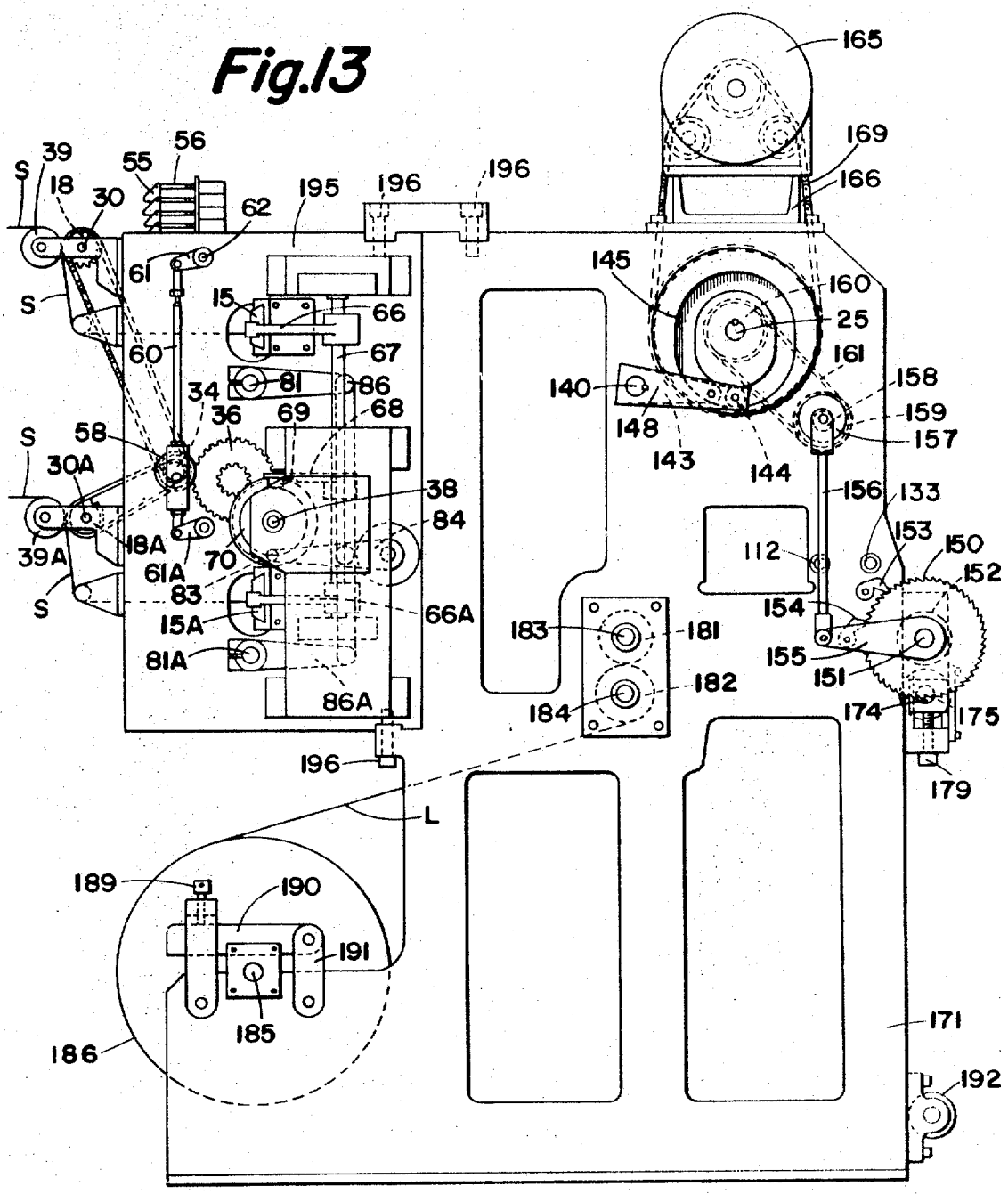
Figure 14:
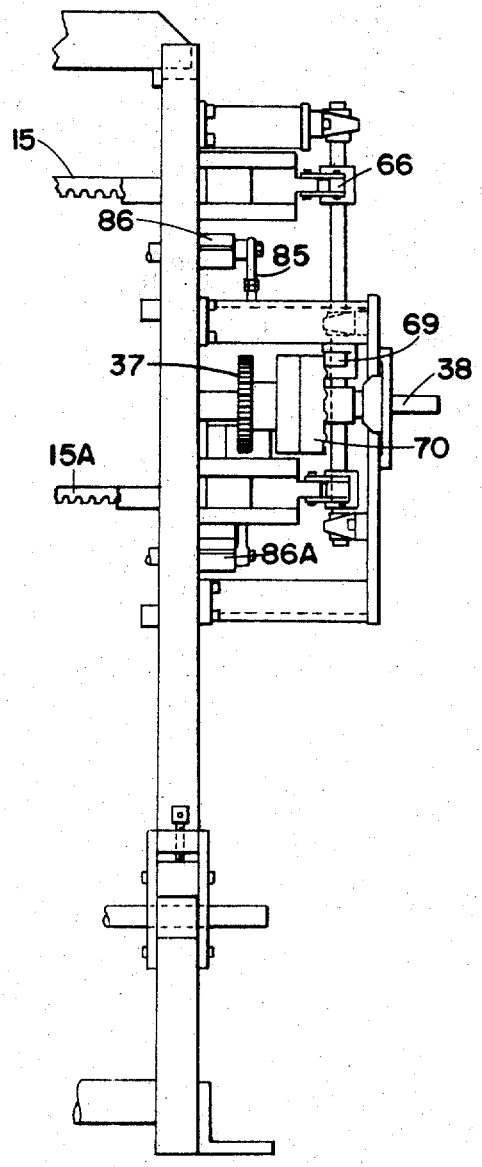
Figure 16:
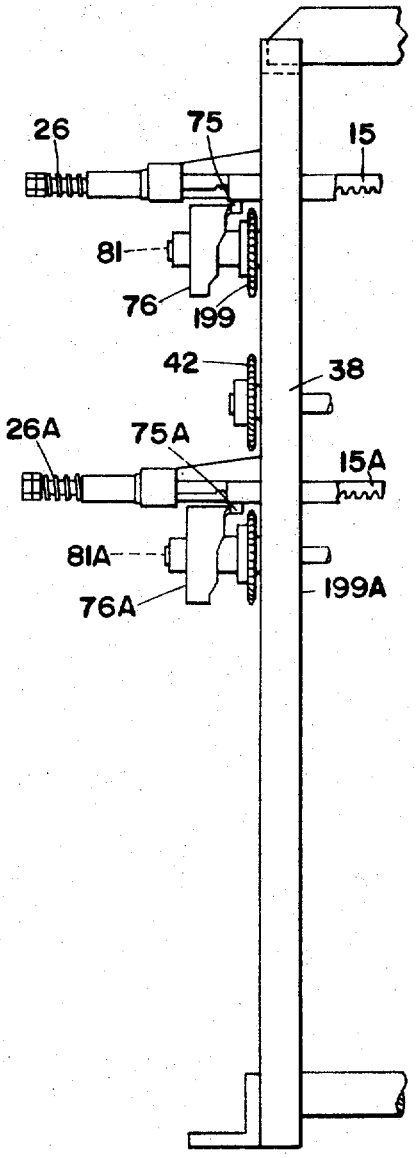
Figure 15:
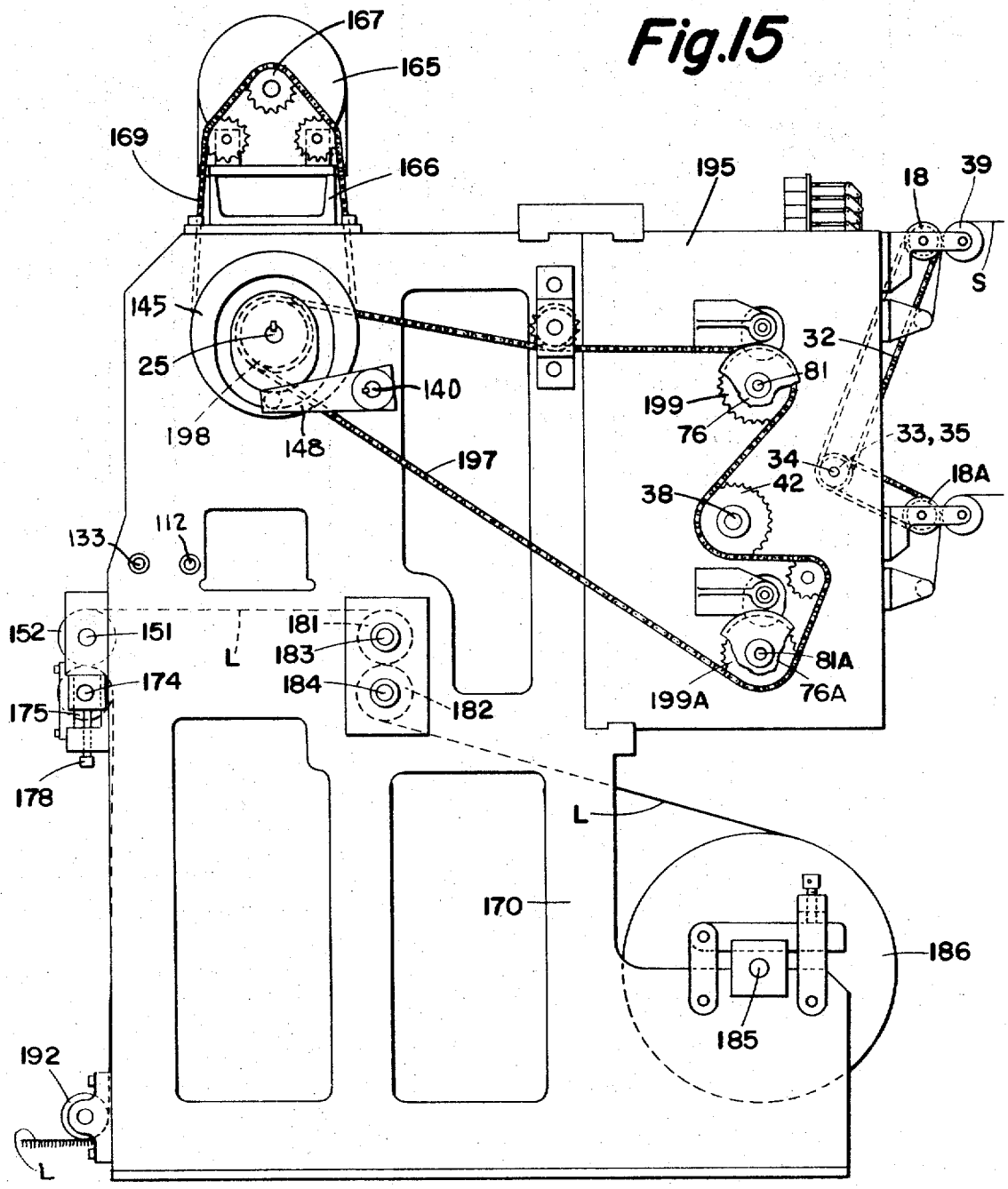
Figure 17:
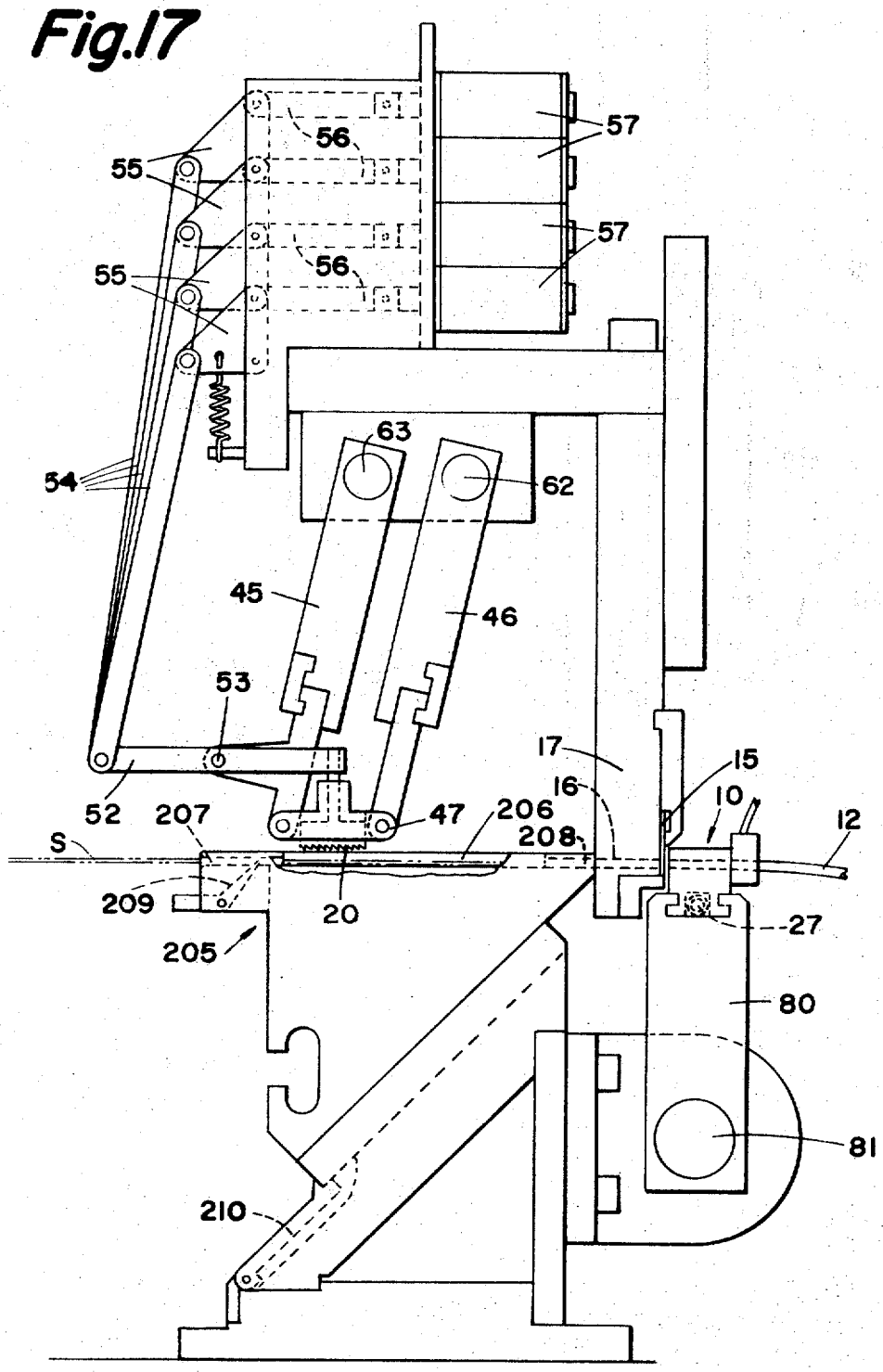
Figure 18A:
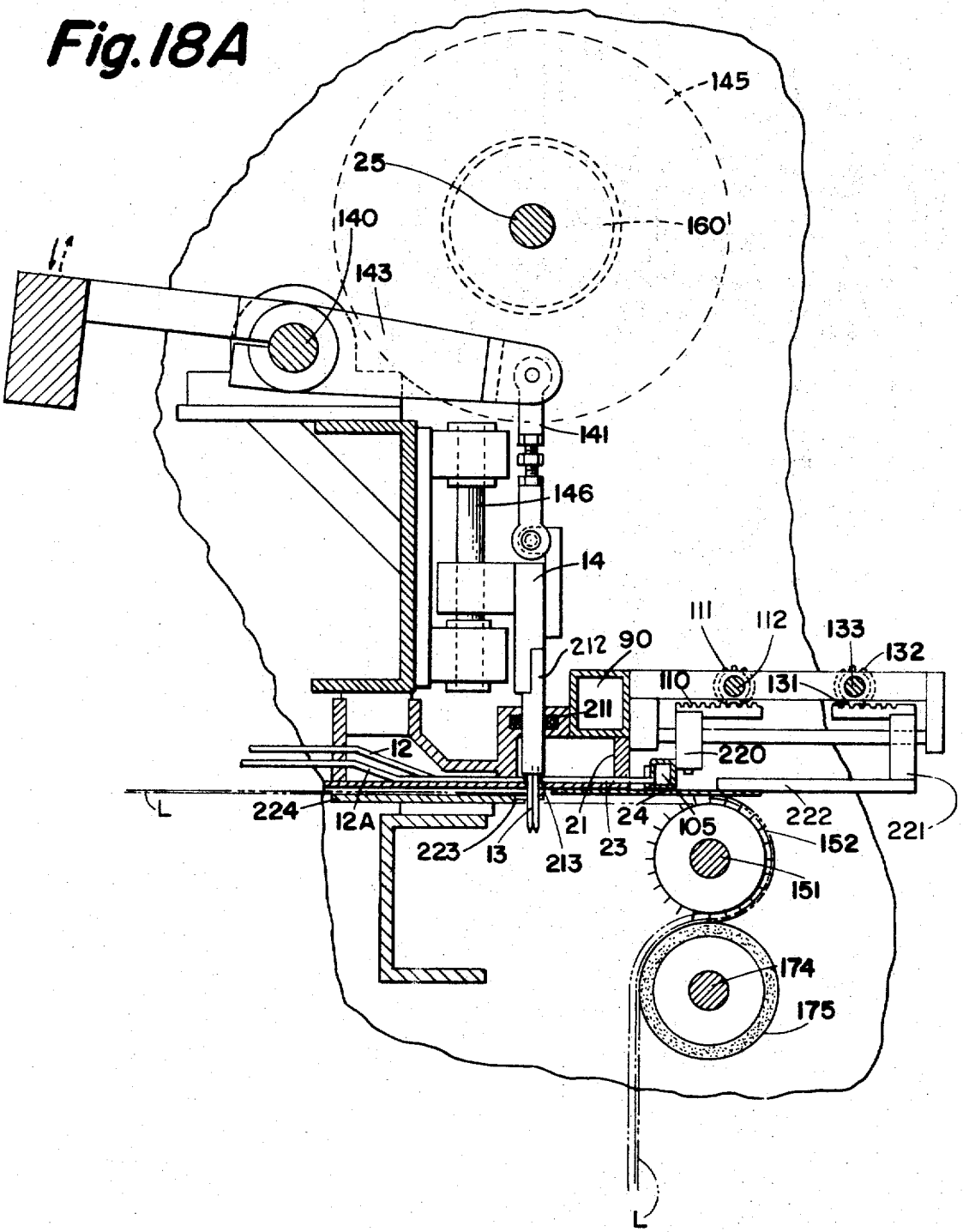
Figure 18B:
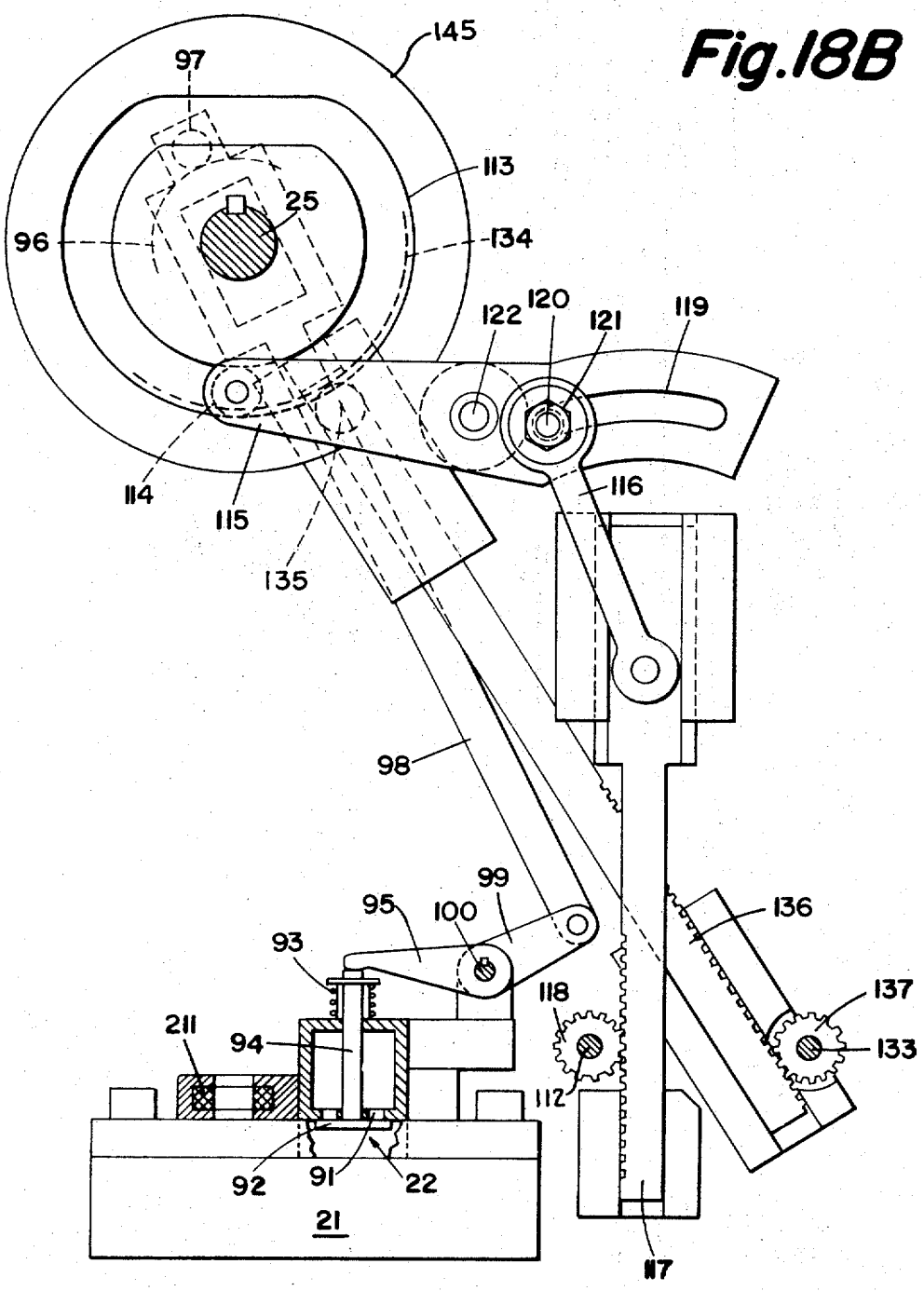
Figure 19:
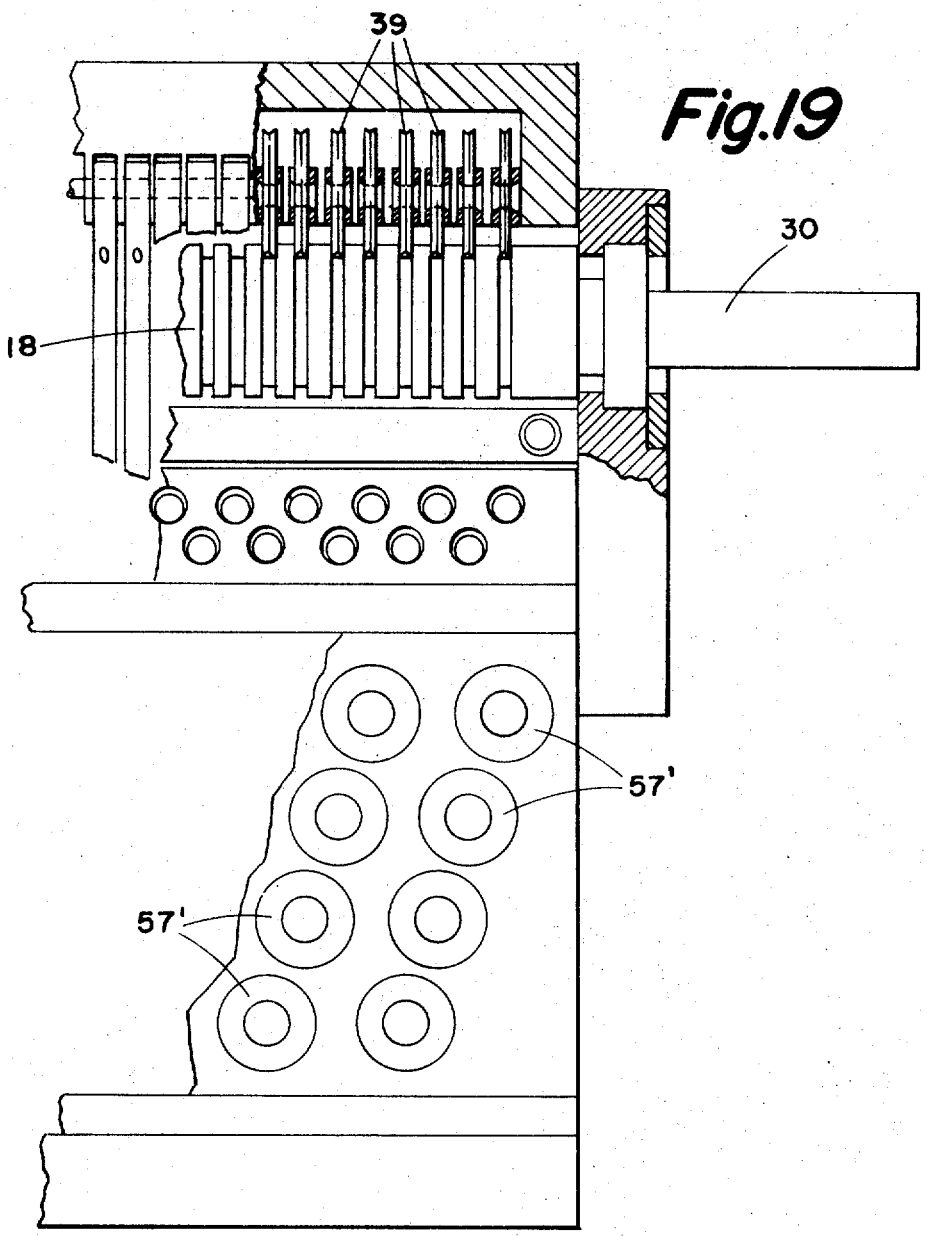
Figure 20:
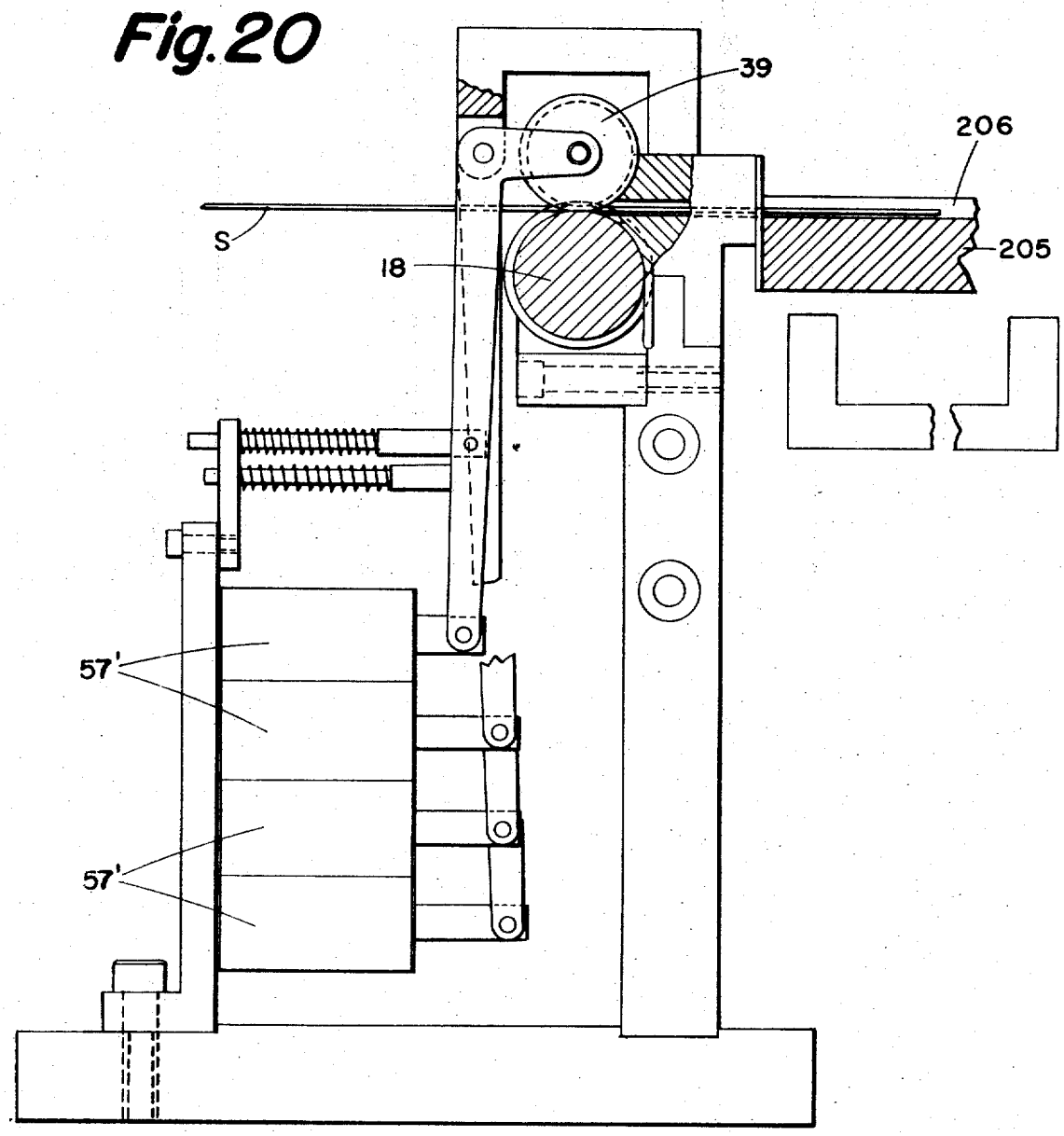
Figure 23A:
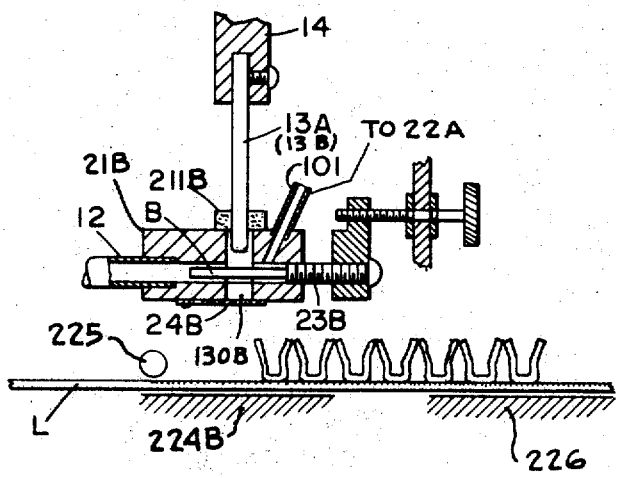
Figure 24:
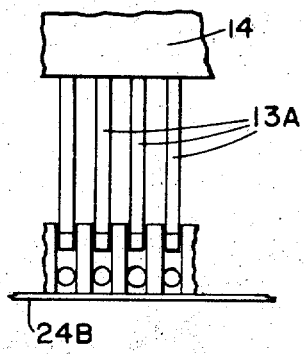
Figure 23B:
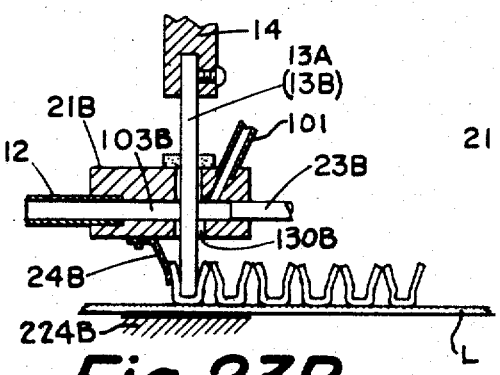
Figure 25:
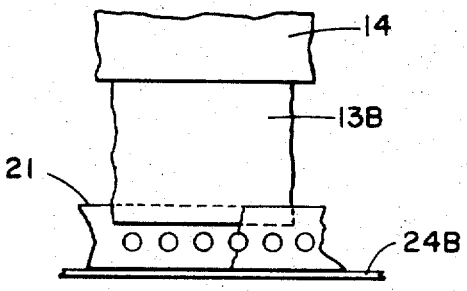

FIG. 2 schematically and in perspective illustrates the yarn-feed capstan of FIG. 1 and associated drive mechanism;

FIG. 3 schematically and in perspective illustrates one of the presser-feet of FIG. 1 and its drive mechanism;

FIG. 4 schematically and in perspective illustrates the yarn cut-off knife of FIG. 1 and associated drive mechanism;

FIG. 5 schematically and in perspective illustrates a yarn-bit magazine of FIG. 1 and mechanism for effecting its linear motion;

FIG. 6 schematically and in perspective illustrates the magazine of FIG. 5 and mechanism for effecting its lateral motion;

FIG. 7 schematically and in perspective illustrates a suction control valve of FIG. 1 and its operating mechanism;

FIG. 8 schematically and in perspective illustrates a bit-centering stop of FIG. 1 and its operating mechanism;

FIG. 9 schematically and in perspective illustrates the shutter-valve of FIG. 1 and its operating mechanism;

FIG. 10 schematically and in perspective illustrates the needle-bar of FIG. 1 and its operating mechanism;

FIG. 11 schematically and in perspective illustrates a pin roll of FIG. 1 and its driving mechanism;

FIGS. 12A and 12B jointly provide a front elevational view of a tufting machine incorporating mechanisms schematically shown in FIGS. 1 to 11 with parts omitted for clarity of illustration;

FIG. 13 is a side elevational view of FIG. 12A as viewed from the left;

FIG. 14 is a rear elevational view of mechanism shown in FIG. 13;

FIG. 15 is a side elevational view of FIG. 12B as viewed from the right;

FIG. 16 is a rear elevational view of mechanism shown in FIG. 15;

FIG. 17 is a detail view, on enlarged scale, of the presser-foot mechanism and some associated components;

FIGS. 18A and 18B are detail views, on enlarged scale, of the drives of the needle-manifold valve, the bit stops and the shutter-valve of the needle manifold;

FIGS. 19 and 20 are front and side elevational views, on enlarged scale, of part of a bank of control solenoids for the yarn-feed mechanisms;

FIGS. 21A–21D are explanatory charts referred to in discussion of various modes of operation of machines embodying the invention;

FIGS. 22A–22D illustrate the construction and steps of operation of a modified needle-loading and bit-applying arrangement;

FIGS. 23A and 23B schematically illustrate, in side elevation, the construction and steps of operation of another loading and bit-applying arrangement; and FIGS. 24 and 25 respectively illustrate, in front elevation, multi-blade and uni-blade constructions suited for the bit-applying arrangement of FIGS. 23A, 23B.

Referring to FIGS. 1 and 3, the magazine 10 has a longitudinal row of spaced chambers 11 each with its discharge end in alignment with the receiving end of a bit-transfer tube 12, serving as a *pneumatic* communication means. The discharge end of each of tubes 12 is adjacent the path of a corresponding one of the forked tufting needles 13 carried by a reciprocable needle-bar 14. While each needle is at rest at the top of its stroke, a yarn-bit B is *pneumatically* delivered to it from the corresponding transfer tube 12 and centered (FIG. 1A). *The suction system hereinafter described in detail is illustrative of one form of pneumatic means for producing a differential of pressure for transport of the yarn-bits, it being understood that other forms of pneumatic means may be utilized.* During the subsequent down-stroke of the needles, the ends of the yarn-bits in them are pushed through the backing layer L (FIG. 1B) to project from the lower face of the layer. In other words, during the subsequent down-stroke of the needles, the centered bits in the double or forked needles are pushed through the backing layer L (FIG. 1B) to form initially a vertical U which is held by a portion of the backing layer straddled by the forked needles. For continued downward motion of the needles, the free ends of the bit ride out of the eyes of the needles before the end of the down-stroke (FIG. 1B) to form an inverted U. The empty needles return to their original position, each to receive another yarn-bit and the backing layer L, with its new line of tufting, is advanced one step in readiness to receive the next line of inverted U tufts.

In the interval between successive reciprocations of the needle-bar, as effected by the one-time shaft 25, each of the chambers 11 of magazine 10 is loaded with a yarn-bit B cut by knife 15 from a yarn strand S, whose end positioned by a corresponding passage 16 in guide means or structure 17, is opposite the receiving end of the chamber to serve as means for receiving ends of yarn strands. Each yarn strand S is looped (FIGS. 1 and 2) about a series of one or more capstan drums 18 between its supply spool 19 and its guide passage 16. Between the capstan and guide passage 16, the strand S passes beneath a reciprocating presser-foot 20. When a bit-length of yarn is to be fed from a spool 19, the associated presser-foot is permitted to drop, in response to a command signal, for engagement with strand S at the beginning of a forward feeding stroke. The resulting tension on the yarn tightens the yarn loop on the capstans, so to pull an additional length of yarn from the spool. The resulting slack in the yarn strand in front of presser-foot 20 is taken up by suction supplied, as later described, through the magazine chamber 11. In consequence, a bit-length of yarn is pulled through passage 16 in the guide 17 and into the chamber 11.

In a modification of the strand-feed arrangement just described, the forward motion of the presser-foot 20 and the mechanism for effecting such forward motion are omitted. In such modified feed arrangement, suction applied through the magazine chamber is effective to tighten the strand as looped over the capstans; the element 20 normally engages the yarn strand and is lifted therefrom when that strand is to be fed to a magazine chamber. The length of the bit cut from the end of the strand received by the magazine chamber may be controlled either by presetting the interval for which the cutter 15 opens the suction path from the magazine to the yarn guide or by presetting the interval for which the presser-foot 20 is up while the cutter 15 has opened such suction path.

Assuming that a command signal has been given to supply a bit-length of yarn from a particular spool 19 to the magazine chamber 11 for a particular needle, such bit-length is cut upon conclusion of the aforesaid feeding operation by a timed movement of the knife 15. The yarn-bit so cut off and left in the magazine is transferred to the corresponding needle by suction applied to its transfer tube 12 via the manifold 21. The timing of the bit-transfer suction is controlled by valve 22. The yarn-bit B as propelled from the delivery end of tube 12 into the then aligned eyes of the forked needle (FIG. 1A) is preferably centered by a reciprocable stop 23. After delivery of a yarn-bit to needle 13, the shutter 24, which seals off the needle passages in the bottom of manifold 21, is retracted so to permit unobstructed movement of the needle first through the backing layer L and then back to its original position.

Although it is possible to use a single magazine for all needles, it is desirable principally for economy of space to use two or more magazines. In the particular tufting machine herein illustrated and described, two magazines 10 and 10A are used. The transfer tubes 12 from the upper magazine 10 extend from its chambers 11 to say the odd-numbered tufting needles and the transfer tubes 12A from the chambers of the lower magazine 10A extend to the even-numbered tufting needles. Both sets of transfer tubes connect to the common suction manifold 21, each adjacent its corresponding tufting needle. The yarn-feeding and cutting mechanisms associated with the lower magazine are the same as for the upper magazine and are identified by the same reference characters plus the suffix A to avoid unnecessary repetition of their description.

A suitable mechanism for driving the yarn-feed capstan 18 is schematically shown in FIG. 2. Because of the horizontal space needed by the yarn strands on a capstan, several capstans may be used. Each capstan then has a groove for each thread of yarn. The capstan shaft 30 is driven via sprocket 31, chain 32 and sprocket 33 from cam shaft 34, which in turn is driven via gear 35, idler gear 36 and gear 37 from shaft 38. The yarn-guide capstan drum 39 adjacent the capstan 18 is driven by gears 41 on their respective shafts. The drive shaft 38 for this yarn-feed mechanism is coupled by means, including sprocket 42 and chain 43, to the one-time shaft 25 of the complete machine. The capstan drums 18 and 39 serve as a common torque amplifier for feeding yarn on demand from any one or more of all spools 19 of the upper tier.

A suitable operating mechanism for each presser-foot 20 is schematically shown in FIG. 3. The lower ends of links 45, 46, are pivotally connected to the respective end of a guide block 47 for the presser-foot. The pin 48 extending from the supporting rod 49 of the presser-foot is received by an arcuate slot 50 in the right-hand or rod-guiding end 51 of lever 52. Intermediate its ends, the lever 52 is pivotally connected at 53 to the link 45. The other end of lever 52 is coupled via link 54 and rocker plate 55 to the biased movable element or armature 56 of solenoid-motor 57 or equivalent. Normally, the presser-foot 20 is out of engagement with the yarn strand S for all angular positions of the parallel-link motion provided by links 45, 46 and their interconnecting guide block 47. The upper end of link 46 is attached to rock shaft 62 which is oscillated under control of the eccentric 58 via cam-follower 59, link 60 and arm 61. The eccentric 58 is attached to and driven by the shaft 34 which is also part of the capstan driving mechanism. To feed a bit-length of the strand S, the solenoid 57 is energized by a command signal at the beginning of a counter-clockwise motion of links 45, 46. The resulting clockwise movement of lever 52 about its pivot 53 lowers the presser-foot 20 into engagement with strand S. Such engagement is maintained until, at the end of the forward or feeding stroke of the presser-foot, the solenoid 57 is deenergized as by a limit switch. As later explained in discussion of more detailed figures, the effective throw of eccentric 58 may be varied to change the bit-length and, therefore, the depth of pile of the finished carpet or rug.

A suitable mechanism for operating the knife 15 is schematically shown in FIG. 4. In the normal position of knife 15, its teeth straddle the yarn paths from the passages 16 in guide 17 to the aligned chambers 11 of magazine 10. At its opposite ends, the knife 15 is pivotally connected to arms 65, 66. One of these arms (66) is fastened to the vertical rock shaft 67 to which is also attached the supporting arm 68 of a cam-follower 69. The arm 68 is biased to maintain engagement between cam-follower 69 and the face of a cam 70 detachably keyed to the shaft 38. For reasons which later appear, the cam 70 may have one or more rises depending upon the number of loading positions of the magazine 10. For economy of time, the magazine 10 has but one loading position for production of single-color carpet; two loading positions for two-color carpet, etc.

A suitable mechanism for effecting linear stepping of the magazine 10 with respect to strand guide 17 (FIG. 4) is schematically shown in FIG. 5. The magazine 10 is biased to maintain engagement between cam-follower 75 and the face of cam 76, which for five-color operation has, as shown, five plateaus. The cam 76 is driven in synchronism with the one-time shaft 25 of the machine. For the particular cam shown in FIG. 5, as it makes one revolution, the magazine 10 is progressively stepped in one direction from its No. 1 loading position to its No. 5 loading position with a dwell between each step and then returns to its No. 1 position from the highest plateau corresponding with the No. 5 position. For one-color operation, the five-plateau cam 76 shown may be replaced by an unstepped disc; for two-color operation, by a two-plateau disc, etc. It will be understood that each forward step of the magazine 10 moves the inlet end of each of its chambers 11 from alignment with one yarn passage 16 in guide 17 to alignment with the next yarn passage 16. Thus, for the five-plateau cam shown in FIG. 5, each chamber, during one revolution of cam 76, is aligned with five successive yarn passages 16 to receive a yarn-bit from any one of the five corresponding supply spools. At the end of one revolution of cam 76, all chambers of the magazine 10 are loaded with yarn-bits whether the machine is set for one-color operation, two-color operation, etc.

To facilitate transfer of the yarn bits, via the suction tubes 12, the loaded magazine is rocked slightly away from the yarn guide 17. A suitable mechanism for effecting such rocking motion is schematically shown in FIG. 6. The supporting arms 80 of magazine 10 are slidably keyed to the shaft 81 which is rocked, once per cycle of the machine, by cam 82 via cam-follower 83, supporting arm 84, link 85 and arm 86 fastened to shaft 81. To avoid possible confusion, it is to be noted that the cam 76 for effecting linear motion of the magazine is not fastened to the rock shaft 81 but revolves freely on it. The shaft 38 to which cam 82 is attached is rotated in synchronism with the one-time shaft 25.

A suitable mechanism for operating one or more valves 22 for suction-manifold 21 is schematically shown in FIG. 7. The duct 90 which extends along the top of manifold 21 in position clear of the needle-bar 14 has a plurality of ports 91. Normally the ports of each valve are closed by the movable valve plate 92 which is biased to closed position by spring 93. The upper portion of the stem 94 of the valve plate 92 extends above the top of duct 90 into the path of a tappet 95. The valve or valves 22 are opened for a brief period in each cycle of the machine under control of cam 96 via cam-follower 97, sliding link 98 and arm 99. At one end, arm 99 is pivotally connected to link 98 and at its other end is attached to the tappet rocker shaft 100. [The] *To provide flow of gas for pneumatic transport of the yarn bits to thread the needles,* duct 90 may be connected as by pipe 101 to the intake of a vacuum pump 102. The duct 90 is of substantial capacity and so serves as a tank or reservoir whose pressure is reduced substantially below atmospheric pressure. In consequence, when the valve or valves 22 are opened, there is a sudden drop of pressure in manifold 21 and the resultant in-rush of air to it via transfer tubes 12, 12A provides for high-speed transport of the yarn-bits from the loaded magazines to the needles.

It may be desired where *low pressure or* vacuum is shown on one side that *a higher, superatmospheric* pressure be exerted on the opposite side to facilitate the movement of the yarn, under certain circumstances, and thereby also eliminating the accumulations of fuzz.

A suitable mechanism for operating the bit-centering stops 23 is schematically shown in FIG. 8. The stops 23 are small hollow tubes extending from the front face of a manifold 105 which is connected, as by flexible pipe 106, to a vacuum line. The free end of each stop tube fits into a short extension tube 107 somewhat less than half the length of the longest bit to be threaded into the needle because the extent to which the yarn-bit extends beyond the needle is initially somewhat less than half the total length of the bit. With the associated needle 13 at rest at the top of its stroke, the open end of each tube 107 is in alignment with the needle eyes and close to the needle to receive one end of the yarn-bit as propelled through the eyes of the corresponding needles. The yarn end is prevented from entering the smaller tube 23 by the apertured plug or screen 108 which serves as a stop. The stopped end portion of the yarn-bit is somewhat compressed because of its high velocity impact with the screen 108 or equivalent. The suction in tube 23 lightly holds the bit so that when stop 23 is retracted, the compression is released and the bit is pulled to a point at which it is centered with respect to the needle axis. The holding suction may be preset to suitable value by valve 123. Each of the guided slide-bars 109 extending rearwardly from manifold 105 is connected to a horizontal rack member 110 engaged by gear 111 on shaft 112. Horizontal reciprocation of rack 110, once per cycle of the machine, is effected by cam 113 via cam-follower 114, lever 115, link 116, rack 117 and gear 118 on shaft 112. The cam 113 is timed to retract the centering stops 23 before the needles descend and to return them to their original position suitably after the descending needles have drawn the right-hand ends of the bits from the extension tubes 107. To provide for adjustment of the stroke of stops 23, to accommodate yarn-bits of substantially different length, the lever arm 115 is provided with an arcuate slot 119. The pivot pin 120 for the upper end of link 116 extends through slot 119 and can be clamped to lever 115 at any desired distance from fixed pivot 122.

The retractable bit-stop arrangement of FIGS. 1 and 8 may be replaced by a manually-preset stop arrangement similar to that shown in FIG. 23A. In such modification of FIGS. 1 and 8, the stops 23 are so adjusted that the distance from each needle 13 to the stop is fixed at somewhat less than one-half of the total length of the yarn-bit. As the bit hits the fixed stop, it compresses, but the compression is relieved as the bit is drawn through the backing layer by the descending needle. In such simplified arrangement, the mechanism for cyclically retracting the stops and the means providing suction therethrough are omitted.

A suitable mechanism for operating the shutter-valve 24 of FIG. 1 is schematically shown in FIG. 9. Normally, the shutter 24 is in the forward position shown to seal off the needle passsages 130 through the bottom wall of manifold 21. After the needles 13 have been threaded with yarn-bits, the shutter 24 is retracted to clear the passages 130 and so permit unobstructed movement of the needles from and back to their threading position. For such purpose, each of the racks 131 is coupled to shutter 24 and is engaged by a gear 132 on shaft 133.

Once per revolution of the one-time shaft 25, the shaft 133 is rotated, first, in one direction, and, then, in the other to its original position by cam 134 via the cam-follower 135, rack 136 and gear 137 on shaft 133.

A suitable mechanism for effecting one reciprocation of needle-bar 14 per machine cycle is schematically shown in FIG. 10. At points spaced along its length, the needle-bar is coupled to shaft 140 by link 141 and an arm 143 which is keyed to the shaft 140. An arm 148, loose on shaft 140 and coupled to an arm 143 by coupling pin 142, carries a cam-follower 144 for engagement with cam 145 which is driven from the one-time shaft 25. During its reciprocation, the needle-bar 14 is maintained in vertical plane by the usual arrangement of guide rods 146 and bearings 147. The pins 142 or equivalent are provided to permit temporary decoupling of the needle-bar from its drive so that all needles may be raised in the clear above the suction manifold 21 (FIG. 1) for inspection and other maintenance purposes.

A suitable arrangement for effecting intermittent feed of the backing layer L is schematically shown in FIG. 11. The ratchet 150 is attached to shaft 151 of the toothed feed roll 152 and is prevented by lock pawl 153 from any retrograde motion due to tension on the layer L. The biased feed pawl 154 is pivotally mounted on rock arm 155 which is free to swing on shaft 151. The free end of arm 155 is pivotally connected to the lower end of link 16 which couples arm 155 to the eccentric 157 fastened on shaft 158. The drive from one-time shaft 25 to shaft 158 includes sprockets 159, 160 and chain 161. Description of the operation of the pawl and ratchet feed is unnecessary. Provisions may be made to adjust the stroke of arm 155 and, therefore, the extent to which the layer L is stepped per cycle of the machine.

With the feed arrangement of FIG. 11, the tufted side of the rug or carpet engages the toothed feed roll 152, with consequent tendency for the applied bits to loosen in the backing layer and for their loops to move away, more or less irregularly, from the untufted side of the backing layer. Such tendency may be overcome by the feed arrangement schematically shown in FIG. 1. In such modified arrangement, the toothed roll 152 is disposed to engage the untufted or loop-side of the backing layer and so press the tuft loops flat against the top-side of the backing layer. As shown in FIG. 1, the storage roll 188 may be driven from the intermittent drive for the feed roll 152 through a slip-drive mechanism including belt 187 to maintain the backing layer L under tension. Permanently to hold the flattened tuft loops in place, a quick-setting cement may be applied, as by spray-header 28, to the untufted face of the finished rug or carpeting while enroute between tensioning roll 152 and storage roll 188.

FIGS. 12A and 12B show the front of a tufting machine incorporating the mechanisms above described. The variable-speed motor 165 mounted on the top frame member 166 is coupled to the one-time shaft 25 via sprockets 167, 168 and chain 169. The shaft 25 extends through the side frames 170, 171, of the machine. The shaft 151 of the pin roll 152 is supported by bearings 172, 173 on the front side of the frame members 170, 171.

The shaft 174 of the rubber-faced back-up roll 175 is similarly supported by the bearing blocks 176, 177. The spacing between rolls 152, 175 is adjustable, as by screws 178, 179, to accommodate carpeting of different pile heights. The rolls 152, 175 (FIG. 11) are beyond and below the needle-bar 14. A similar pair of pin and back-up rolls 181, 182 (FIGS. 13, 15) is supported in advance of and below needle-bar 14 by shafts 183, 184 respectively. The latter pair of rolls 181, 182 is not power-driven but serves to hold the backing layer L flat and taut below the needle-bar. The supply roll 186 for the backing layer L is supported by shaft 185 extending between the side frames 170, 171 of the machine. To facilitate replacement of the supply roll 186, its end bearings may be released by unloosening clamping screws 189 (FIG. 13) and swinging links 190, 191 about their respective pivots. The backing layer L is threaded as best shown in FIGS. 13 and 15. The tufted backing layer passes under guide roll 192 at the back of the machine to a take-up roll not shown.

The mechanisms for feeding the yarn from the spools to the yarn guide, for driving the magazines and for operating the cut-off knives are all included in a sub-assembly 195 (FIGS. 13–16) held to the main frame of the machine by releasable coupling means including the pins or bolts 196. The operating shaft 38 of these mechanisms may be driven in synchronism with the one-time shaft 25 of the machine via chain 197 (FIG. 15) and sprockets 42, 198 on the respective shafts; the idler sprockets 199, 199A for this chain are loose on their respective supporting shafts 81, 81A. The biasing springs 26, 26A for the knives 15, 15A most clearly appear in FIG. 16.

As shown in FIG. 17, the platform 205 below all of the presser-feet 20, has guide recesses 206, each receiving the yoke 47 of the associated presser-foot. A passage 207 guides each yarn strand S to the corresponding recess 206 and a passage 208 guides the yarn strand S from recess 206 into the corresponding passage 16 of the common yarn guide 17. A biased brake-finger 209 engages each strand in the inlet passage 207 to prevent retrograde movement. When a presser-foot 20 is lowered in response to energization of its solenoid 57, the yarn strand is pressed against the bottom of the recess 206 so that it is pushed forward during the feed-stroke of the presser-foot. The platform 205 may be removed for maintenance purposes by releasing the latches 210. As shown in FIGS. 17, 19 and 20, the solenoids 57 for the strand-feeding mechanisms are arranged in a bank of staggered vertical and horizontal rows for economy of space; there are two such banks, one for each magazine 10, 10A (FIG. 1).

Leakage of air into needle-manifold 21 is minimized by the felt packing 211 (FIG. 18A) which provides a seal for the extension 212 of needle-bar 14. Each of the split needles 13 also passes through a felt washer 213 immediately above the discharge end of the corresponding bit-transfer tube 12 or 12A and the receiving end of the stop tube 23 so to concentrate inflowing air about the needle eye. The vacuum-manifold 105 for the stop tubes 23 is supported externally of the needle-manifold 21 by a pair of slides 220 which carry rack 110. This rack engages gear 111 on shaft 112 (FIG. 18A) which is rocked under control of cam 113 via cam-follower 114, arm 115, link 116, rack 117 and gear 118 on shaft 112 FIG. 18B). The shutter 24 for normally closing the needle holes in the bottom of manifold 21 is supported from a second pair of slides 221 through the intermediary of bar 222 (FIG. 18A). The slides 221 carry the rack 131 (FIGS. 18A, 18B) which engages gear 132 on shaft 133. This shaft is rocked under control of cam 134 via cam-follower 135, rack 136 and gear 137. The needle-comb 223, spaced below the bottom of the needle-manifold 21, serves as a continuation of the plate 224 over which the backing layer L is intermittently stepped in the path of the tufting needles 13.

In FIGS. 12–20, elements of the various mechanisms are identified by the same reference characters as in FIGS. 1–11 so that further description of them appears unnecessary. FIGS. 19 and 20 show a modified yarn-feed arrangement in which each yarn feed solenoid 57A is energized concurrently with a corresponding presser-foot solenoid 57 so as to rock the corresponding idler roller 39 and press the selected yarn strand against the feed-capstan 18.

Figure 21A:
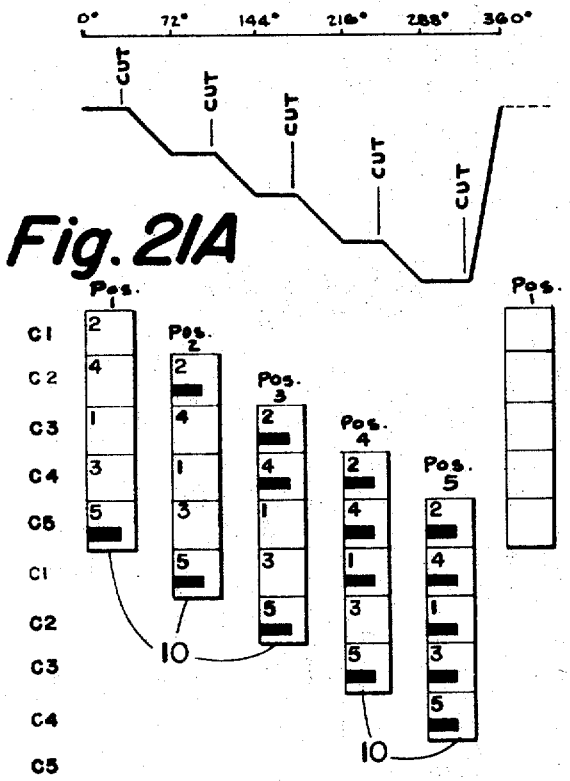

The preferred tufting machine above described provides many different modes of operation and is suited to produce tufted carpeting and the like having any desired number of colors and in any conceivable pattern. In explanation of such flexibility and of methods which can be performed, a relatively few specific examples are discussed below. For example, to produce a carpet or rug whose total pattern requires five different colors to meet the demand for a bit of any of these colors at any point of any line in the pattern, the yarn-strands are threaded into passages 16 of guide 17 (FIG. 1) in the repeating sequence of the five colors Nos. 1 to 5, as indicated in the left-hand column of FIG. 21A. It is assumed that a bit-sequence of colors Nos. 2, 4, 1, 3, 5 is needed to meet the requirements for part of a pattern line. Therefore, a series of five adjacent chambers of magazine 10 (FIG. 3) should be so loaded. In such case, as shown in FIG. 21A, at loading position No. 1 of the magazine, the 5th chamber of the series is loaded with a C5 bit; at loading position No. 2 of the magazine, the first chamber of the series is loaded with a C2 bit; at loading position No. 3, the second chamber of the series is loaded with a C4 bit; at loading position No. 4, the third chamber of the series is loaded with a C1 bit; and at loading position No. 5, the 4th chamber of the series is loaded with a No. 3 bit. Thus, the five adjacent chambers of the magazine 10 have been loaded with yarn-bits in the required colors.

It can similarly be shown that for any single color Nos. 1 to 5, and for all demanded combinations and permutations of two or more of the colors Nos. 1 to 5, the chambers 11 of magazine 10 will be fully loaded with colored yarn-bits in the proper sequence to produce any desired line pattern. It is to be noted that for the five-position operation of magazine 10, the total number of supply spools therefor need be only equal to the number (plus four) of chambers in magazine 10 because the color C5 need not be repeated. Specifically for a 15-foot rug and 5/32 inch between strand bits, 1152 strand-bits are needed. Therefore, magazine 10 supplies 576 needles. The total required number of supply spools for magazine 10 is 576+4=580. Magazine 10A also supplies 576 needles and requires 576+4=580 supply spools.

Figure 21C:
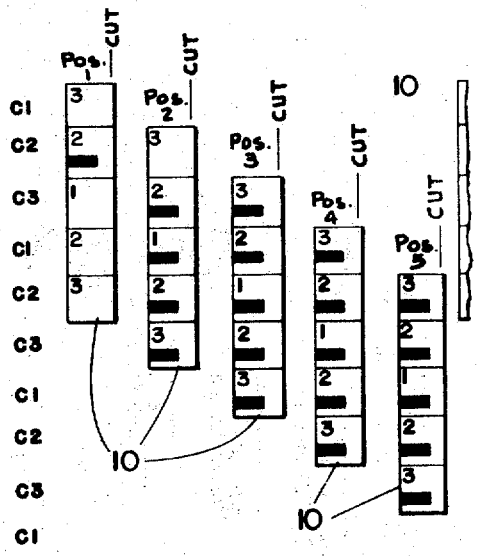
Figure 21B:
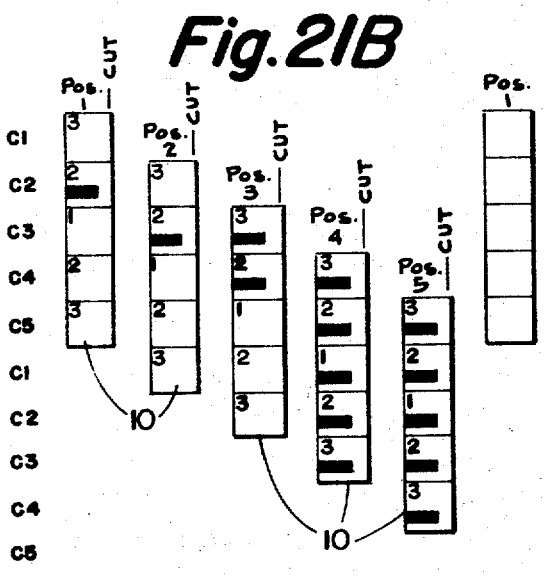

The five-position mode of loading may also be used, without disturbing the five-color thread, to produce a carpet or rug whose total pattern requires any lesser number of colors. One example of how a three-color demand is met is shown in FIG. 21B: the assumed required sequence in this case is Nos. 3, 2, 1, 2, 3. It is to be noted that all chambers of the magazine become loaded although no yarn is drawn from the C4, C5 color spools.

The five-position mode of loading may also be used with the guide 17 rethreaded with a repeating sequence of a lesser number of colors. One example of how a three-color demand is met is shown in FIG. 21C. To permit direct comparison with FIG. 21B, the same sequence (3, 2, 1, 2, 3) of color demand for five successive chambers of magazine 10 is shown. The difference between the loading patterns for five-position, five-color operation and five-position, three-color operation is evident, but, again, all chambers of the magazine are loaded with bits in proper sequence for discharge to the transfer tubes before the magazine is returned from its No. 5 position back to its No. 1 position. It can be similarly shown that for any single color Nos. 1 to 3 and for all combinations and permutations to two or more of the colors Nos. 1 to 3, the chambers of magazine 10 will be fully loaded with colored yarn-bits in proper sequence to produce any desired line pattern. In the same manner, it can be shown that with the guide rethreaded with a repeating sequence of any two colors, or any four colors, or with all strands of single color, the five-position mode of magazine loading meets all loading requirements that can be demanded.

Figure 21D:
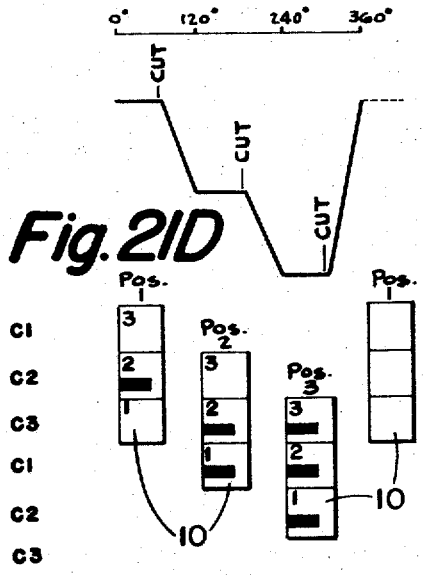
Figure 22A:
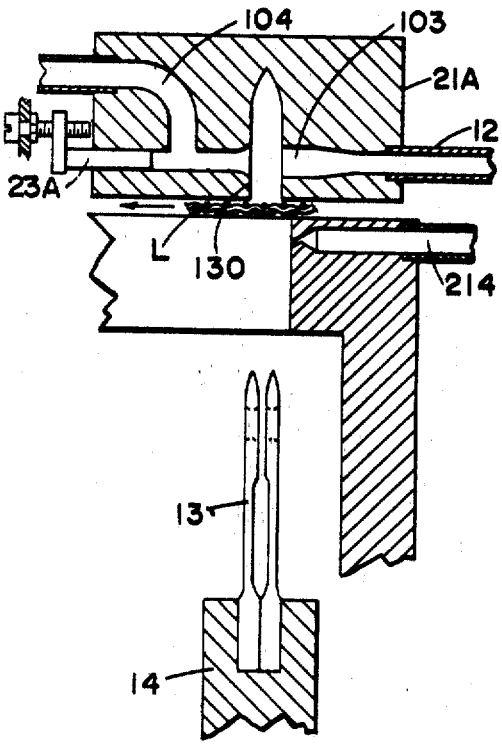
Figure 22B:
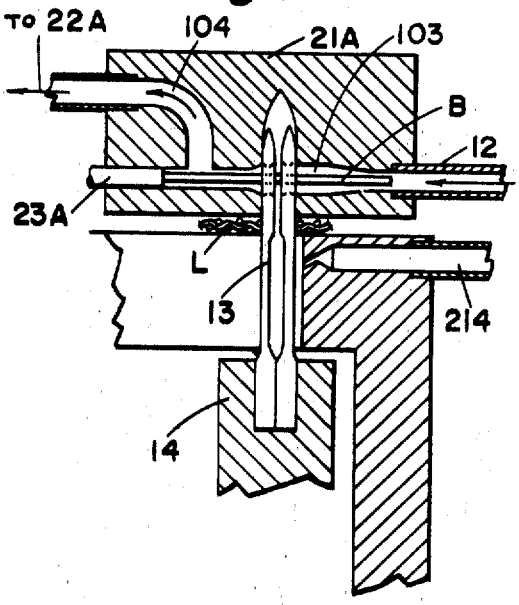
Figure 22C:
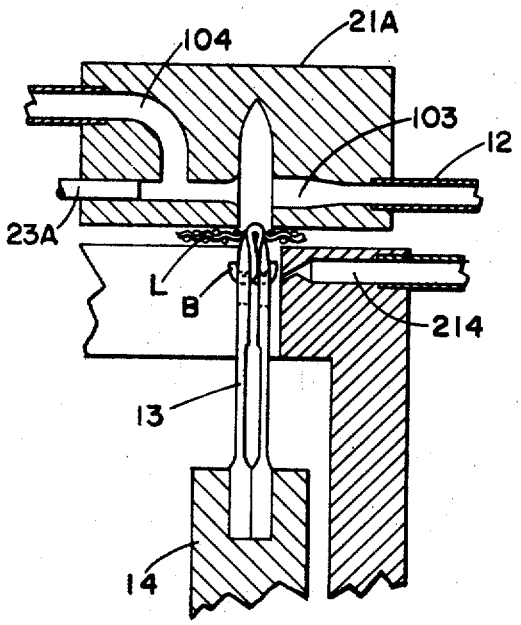
Figure 22D:
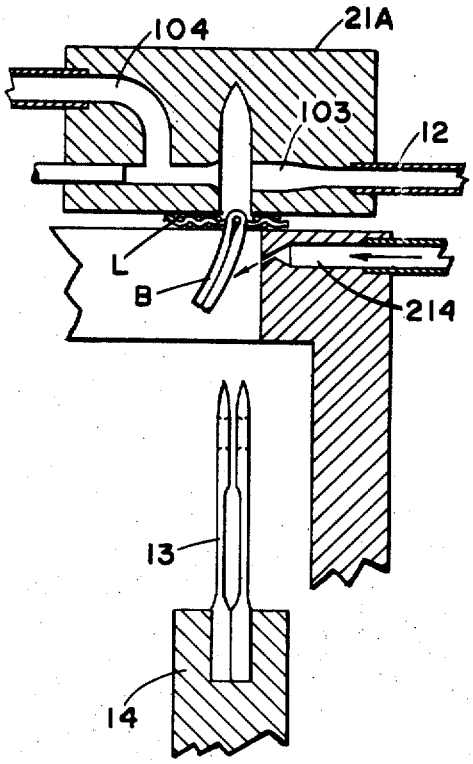

However, unnecessary cutting and scanning movements of the magazine can be eliminated by threading the guides with only the colors required for the total rug pattern and by reducing the number of loading positions of the magazine to correspond with that number of colors. Again assuming a specific three-color example for purposes of explanation, FIG. 21D shows the yarn-color sequence in the guide to be C1 to C3. The color sequence demand in a series of three successive chambers of magazine 10 may be C3, C2, C1. In this case, at magazine position No. 1, the second chamber of the series is loaded with a C2 bit; at position No. 2, the third chamber is loaded with a C1 bit; and at loading position No. 3, the first chamber of the series receives a C3 bit so to conclude full loading of the series of chambers with color-bits in the demanded sequence. It can similarly be shown that for the three-position mode of loading, the demand for any single color No. 1 to No. 3 and for any or all possible combinations and permutations of two or more of the colors Nos. 1 to 3 results in proper loading of the magazine and without need to disturb the three-color threading of the guide.

From the foregoing examples, it should now be clear that for a magazine 10 having C-loading positions (where C is an integer equal to or greater than the number of colors required for a total rug pattern), the magazine is fully loaded with color-bits in proper line-sequence to meet any and all possible color combinations and permutations. It should also now be clear that a minimum number of cutting operations and a minimum number of loading stations are obtained when the guide 17 is threaded only with the required colors and in a repeating sequence of them.

For maximum production rate, the total number of supply spools for the magazine need be only $$M=N+(C-1)$$

where:

M=number of spools
N=number of chambers per magazine
C=number of magazine loading positions.

In the particular machine shown as set up for five-position loading in manufacture of carpet which is 15 feet wide, there are, as above noted, 1152 needles and 580 supply spools for each of the two magazines 10, 10A.

It is to be noted that for manufacture of single-color rugs, only one color yarn need be used and the magazine need not be stepped. In this case, the total number of yarn-supply spools will be equal to the number of magazine chambers, the magazine is left stationary, and the needle-stroke rate is the same rate at which yarn-bits are cut. Such threading and mode of operation affords maximum rate of production of single-color rugs.

It is to be further noted that if only one color is to be used for manufacture of a single-color rug with the machine set up and threaded for five colors, then the magazine, as stepped during each needle-stroke, is completely loaded from one spool per group of five magazine chambers. In such case, the production rate with one-color yarn is the same as if five colors of yarn were used but only 1/5 of the total number of yarn spools would be used or needed.

The programming means for the command signals to the solenoids 57, or equivalent, is not part of the present invention. It may utilize, for example, a magnetic record tape, a punched record tape or web, patterned contact drums, or a programmed computer or logic circuitry associated with light-responsive scanning means for a master pattern, etc.

FIGS. 22A–22D illustrate another and preferred method of assembling yarn-bits on the backing layer and a modification of the apparatus previously described to adapt it for performance of such method. In this method and apparatus, the backing layer L is indexed one pitch while the needle-bar 14 is in a down-dwell position (FIG. 22A) with each of the empty needles 13 in inverted position below the backing yarn layer and out of the suction-manifold 21A.

As the bar 14 moves to its up-dwell position (FIG. 22B), the empty needle 13 passes through the backing layer L. In the bit-loading position of the dual needle 13 (FIG. 22B), its eyes are in the path of travel of a yarn-bit B and its shank is through the backing layer so to bring the needle-eye in the path of a yarn-bit B for *pneumatic* loading of the needle while its shank is extending through layer L. Suction is then applied to the manifold 21A to transport a yarn-bit B from the loaded magazine via tube 12 and through the needle eye. The end wall 23A of the corresponding chamber 103 in manifold block 21A serves as a stop for the yarn-bit as loaded in the needle. The suction-outlet port 104 is so located that the suction serves to brake the yarn-bit B as it approaches the centered position. Leakage of air is minimized because each needle passage 130 of the manifold 21A is substantially blocked by the needle shank and the adjacent area of the backing layer L.

As the loaded needle 13 moves downwardly (FIG. 22C), the free ends of the yarn-bit are pulled through the backing layer L and the central part of the yarn-bit between the split shank of the needle is engaged by the top face of the backing layer and drawn to a tight loop which, in this method and arrangement, is not loosened by return of the needle to bit-loading position.

By the time the needle-bar 14 has reached its downdwell position (FIG. 22D), the now applied yarn-bit B is clear of the eye of needle 13. Before the next upstroke of the needle the backing layer L is indexed to the left and a blast of air from nozzle 214 blows the tuft legs of the bit B out of the path of the empty needle as it next ascends to pass through layer L to bring its eye-end into the suction-loading chamber or passage 103. Thus, the loop of the previously applied bit is not loosened but remains tight against the upper face of the backing layer L. This insures a good bond to any layer of thermoplastic or the like subsequently applied to the untufted side of the rug or carpet and also a smooth appearance of the resulting back face of such manufactured article.

It is, of course, to be understood that suction for all suction-loading chambers 103 (FIG. 22A) may be controlled by a valve 22A (FIG. 22B) operated in synchronism with the needle-bar 14 and that the air blast to a common nozzle 214, or plurality of nozzles, may be similarly controlled by an air-value.

In the modification of the bit-applying arrangement shown in FIGS. 23A and 23B, the tufting needles 13 are replaced on the needle-bar 14 either by a like number of narrow, blunt-edged blades 13A (FIG. 24), each serving as one bit-applying element, or by a single, blunt-edged blade 13B (FIG. 25) of width suited to provide all bit-applying elements.

In either case, when the needle-bar 14 is at its upper position (FIG. 23A), the lower blunt edge of each bit-applying element is above the empty loading station formed by a chamber 103B (FIG. 23B) in the suction-manifold 21B. At that time in the machine cycle, as in previously described arrangements, suction is momentarily applied to transfer a yarn-bit B (FIG. 23A) via tube 12 to the loading station. The stops 23B (FIGS. 23A, 23B) are present so that the delivered bit B is centered with respect to the path of reciprocation of the bit-applying element. Loss of air is minimized by provision of sealing element 211B which is fixed to the upper face of manifold 21B for continuous engagement with the bit-applying element 13A (13B) and by provision of the flap valve 24B which is biased to close the lower passage 130B.

As the needle-bar 14 descends, each bit applying element 13A (13B) engages the corresponding bit B, pushes it through passage 130B in the shape of a U, and presses the loop portion, or bottom, of the U-shaped bit against the upper face of the backing layer L for boding engagement therewith (FIG. 23B). Conventional bonding techniques may be used. For example, if the backing layer L is of thermoplastic material or coated therewith, it may be activated by heat supplied via the underplate 224B at the bit-applying zone and/or the element 225 in advance of the bit-applying zone; in such case, setting of the bonds between the applied bits and the backing layer may be effected or accelereated by cooling of underplate 226 beyond the bit-applying zone. In another example, a quick-setting adhesive may be applied to the upper face of the backing layer L immediately in advance of the bit-applying zone; in such case, the element 225 may be a spray-header. In connection with the method and apparatus of FIGS. 23A, 23B, 24, 25, it is to be noted that a relatively small loop or fold-over portion of each strand, sufficient for permanent bonding, is pressed into a cement surface, hot or cold, or into a thermoplastic surface, or into any suitable quick-acting gripping surface which is also flexible.

As in the previously described arrangements, the suction for all loading chambers 103 (FIGS. 22A–25) may be controlled by a valve 22A operated in timed relation with the needle-bar 14.

It shall be understood the invention is not limited to the particular machines illustrated and described but also comprehends modifications and equivalents within the scope of the appended claims.

It is also to be understood that the apparatus may be used for manufacture of fabrics other than those described. For example, it is clear that the adhesive bit-strand gripping surface could be applied or located on the tufted side of the backing material and the untufted side could be made to have the appearance of petit-point. In such case, the tufts would be short and the adhesive could be applied before, during or after tufting. Similarly, the adhesion could be thermoplastic in character, for example, and the bit-strands made to adhere by the application of heat and pressure on the surface opposite the tufted surface.

What is claimed is:

1. A tufting machine for applying yarn-bits to a backing layer comprising bit-loading stations adjacent said backing layer, bit-applying elements for engaging and transferring yarn-bits from said stations to said backing layer, stop means for positioning yarn-bits at said stations for transfer by said bit-applying elements, mechanism for repeatedly reciprocating said bit-applying elements past said stop means, means for receiving the ends of yarn strands fed from respective supply spools and having communicating means for discharging yarn bits into the bit-loading stations against said stop means and in the respective paths of said bit-applying elements, suction means associated with said communicating means for transporting yarn-bits after severance from said strands, and severing means in advance of said bit-loading stations and operating in timed relation to said reciprocating mechanism to cut said yarn-bits from said strands.

2. A tufting machine as in claim 1 in which said communicating means are tubes and in which the bit-applying elements are needles having eyes which are in alignment with the discharge ends of said tubes for the loading position of said needles at said stations.

3. A tufting machine as in claim 2 additionally including a suction chamber in which the needles are loaded at said stations, from which the eye-ends of the loaded needles emerge to pierce the backing layer and apply the yarn-bit, and back into which the eye-ends of the needles are retracted before indexing of the backing layer to its next bit-receiving position.

4. A tufting machine as in claim 2 additionally including a suction chamber with loading stations into which the eye-ends of the needles are moved after passing through the backing layer, and from which the eye-ends of the needles return back through and clear the backing before the eye-ends of the needles next pierce the backing layer to apply the yarn-bit, the backing layer being indexed layer to enter said loading stations.

5. A tufting machine as in claim 1 in which the bit-applying elements are blunt-ended blade elements for pushing yarn-bits from the loading stations and applying them to said backing layer.

6. A tufting machine as in claim 1 in which
means for feeding the yarn strands to corresponding passages of said communicating means include
capstan means over which the strands are looped, and
selectively energizable control means for determining when and which yarn strands are tightened on said capstan means to feed a bit-length of yarn from corresponding supply spools and to advance it toward said means for receiving the ends of the yarn strands.

7. A tufting machine as in claim 1 including
a magazine structure adjacent said means for receiving the ends of yarn strands and having bit-storage chambers having the same spacing as passages of said means for receiving the yarn-strand ends, and
means for effecting relative stepping movement of said magazine to align each of said chambers of the magazine with successive passages of said means for receiving the yarn-strand ends between successive operations of said severing means.

8. A tufting machine as in claim 7 in which
means are provided to displace said magazine structure from said means for receiving the yarn-strand ends when all chambers are loaded with yarn-bits, and
timed pneumatic-control means associated with said communicating means to effect transfer of the yarn-bits from the displaced magazine to the bit-applying elements.

9. A tufting machine as in claim 7 additionally including
magazine-loading means operative in the interval between successive cycles of reciprocation of the bit-applying element to charge said chambers of the magazine with yarn-bits.

10. A tufting machine as in claim 9 in which said magazine-loading means includes
a guide having rows of passages for receiving the ends of yarn strands fed from respective supply spools, and
cutting means operated in timed relation to said bit-applying elements for cutting yarn strands extending from said passages into aligned chambers of said magazine so to provide yarn-bits.

11. A tufting machine as in claim 10 additionally including
means for effecting relative stepping movement of said magazine and said guide in the interval between successive operations of said cutting means for charging of the magazine with yarn-bits of selected colors in predetermined positions.

12. A tufting machine as in claim 1 in which said stop means comprises
a plurality of bit-stops respectively in alignment with the discharge ends of said communicating means.

13. A tufting machine as in claim 12 additionally including
means operating in timed relation to reciprocation of the bit-applying elements for retracting said bit-stops to center the yarn-bits delivered to said stations.

14. A tufting machine as in claim 12 additionally including
manually-adjustable means for presetting said bit-stops in fixed position.

15. A tufting machine as in claim 1 in which
a suction-manifold encloses the bit-engaging end portions of said bit-applying elements at the loading stations and receives the discharge ends of said communicating means, and which has
means supplying suction in said manifold for pneumatic transport of yarn-bits via said communicating means to said loading stations.

16. A tufting machine as in claim 1 in which the bit-applying elements are needles and in which a suction-manifold encloses said needles in their bit-loading position, receives the discharge ends of said communicating means, and has provision for needle access to the backing layer.

17. A tufting machine as in claim 16 additionally including
a needle-bar for supporting the needles, and
means for decoupling said needle-bar from its actuating mechanism to permit the needles to be lifted from said suction manifold for maintenance purposes.

18. A tufting machine as in claim 1 in which the bit-applying elements are needles and in which
a suction-manifold encloses said needles in their bit-loading position, receives the discharge ends of said communicating means, and has needle-apertures in the wall adjacent said backing layer, and which has
a shutter plate in position closing said apertures during the time for pneumatic transport of yarn-bits via said communicating means to said needles, and in retracted position during reciprocation of the needles for application of the yarn-bits to the backing layer.

*19. A tufting machine comprising*
*a loading station having a passageway for flow of air,*
*a reciprocable bit-applying element,*
*means for moving said bit-applying element transversely across said passageway from a loading position to a bit-applying position,*
*structure having a passage extending to said passageway for receiving yarn,*
*yarn-cutting means,*
*means for moving said yarn-cutting means across said passage to detach a yarn-bit from the yarn, and*
*means for producing flow of air through said passage for transport of the yarn beyond said yarn-cutting means to an extent corresponding with the bit-length to be detached by said yarn-cutting means and for transporting the bit-length of yarn into the loading position relative to said bit-applying element.*

*20. A tufting machine comprising*
*a loading station having a passageway for flow of air,*
*a reciprocable bit-applying element,*
*means for moving said bit-applying element across said passageway from a loading position to a bit-applying position,*
*structure having a passage extending to said passageway for receiving yarn,*
*yarn-cutting means,*
*means for moving said yarn-cutting means across said passage to detach a yarn-bit from the yarn,*
*means for producing flow of air through said passage for transport of the yarn beyond said yarn-cutting means to an extent corresponding with the bit-length to be detached by said yarn-cutting means and for transporting the bit-length of yarn into the loading position relative to said bit-applying element, and*
*timing means associated with said yarn-cutting means and said bit-applying element providing that the yarn bit detached from the yarn is pneumatically fed as a discrete bit to said loading station before movement of said bit-applying element from its loading position.*

*21. In a tufting machine for forming tufts on a backing, the combination of*
*tufting needle means having an eye-threading position on one side of the backing and a tufting position on the other side of the backing,*
*means for moving said tufting needle means from said eye-threading position to said retracted position,*
*pneumatic means for propelling tufting material to transversely thread the eye of said tufting needle means while in threading position on said one side of the backing, and*
*severing means operable to cut tufting material from a strand thereof.*

*22. In a tufting machine for forming tufts on a backing, the combination of*

*tufting needle means having an eye-threading position on one side of the backing and a tufting position on the other side of the backing,*

*means for moving said tufting needle means from said eye-threading position to said tufting position,*

*pneumatic means for propelling tufting material to transversely thread the eye of said tufting needle means while in threading position on said one side of the backing,*

*means for arresting the tufting material in threaded relation with the tufting needle means for transfer to the backing when the tufting needle means passes to said retracted position on the other side thereof, and*

*severing means operable to cut the tufting material from a strand thereof.*

*23. In a tufting machine for forming tufts on a backing, the combination of*

*tufting needle means comprising a pair of spaced shank members with aligned eyes having a threading position on one side of the backing and a tufting position on the other side of the backing,*

*means for moving said tufting needle means from said eye-threading position to said tufting position,*

*pneumatic means for propelling tufting material to transversely thread said aligned eyes while the tufting needle means is in said threading position on one side of the backing, and*

*severing means operable to cut the tufting material from a strand thereof.*

*24. In a tufting machine for forming tufts on a backing, the combination of*

*tufting needle means comprising a pair of shank members with aligned eyes and having a threading position on one side of the backing and a tufting position on the other side of the backing,*

*means for moving said tufting needle means from said eye-threading position to said tufting position,*

*pneumatic means for propelling tufting material to transversely thread said aligned eyes while the tufting needle means is in said threading position,*

*means for arresting the tufting material extending through said eyes for transfer to the backing when said tufting needle means passes to said tufting position on the other side of the backing, and*

*severing means operable to cut the tufting material from a strand thereof.*

*25. A tufting machine comprising*

*a plurality of tufting means,*

*means for moving said tufting means from a loading position to a bit-applying position,*

*means providing passages at least in part disposed transversely of said tufting means, each for supplying yarn to a corresponding tufting means while said tufting means is at said loading position,*

*pneumatic means providing for flow of air through said passages to transport said yarn to said loading position extending transversely of said tufting means, and*

*means for cutting the yarn for transfer by said tufting means of yarn bits to form said tufting.*

*26. A tufting machine comprising*

*a plurality of tufting needle means,*

*means for moving said tufting needle means from a threading position to a tuft-applying position,*

*means providing passages each for supplying yarn to a corresponding needle means when in said threading position,*

*cutting means located in cooperative relation with said passages for cutting bits of yarn, and*

*pneumatic means providing for flow of air through said passages to feed strands of the yarn bit-lengths beyond said cutting means and for transport of said bits to said needle means and into threaded relation therewith.*

*27. A tufting machine comprising*

*tufting needle means,*

*means for moving said tufting needle means from a threading position to a tuft-applying position,*

*a common outlet passage means providing a plurality of yarn-inlet passages for supplying yarn via said common outlet passage to said needle means when in said threading position,*

*a group of yarn selectors providing for supply of yarn to a plurality of said inlet passages and each including a yarn-restraining means,*

*means for controlling said yarn selectors to select the yarn to be supplied to said tufting needle means,*

*pneumatic means providing for flow of air to move the selected yarn a bit-length toward and into threaded relation with said needle means while in said threading position, and*

*means disposed in the path of said yarn for severing therefrom said bit lengths.*

*28. In a tufting machine for applying tuft bits to a backing, the combination of*

*threading stations adjacent one side of the backing,*

*means for passing said tufting needles through the backing to and from the respective threading stations,*

*strand-severing means for severing bits from strands of tufting material,*

*pneumatic means including flow passages respectively extending from said strand-severing means and arranged transversely of said tufting needles in the region of said threading stations for propelling severed bits from said strand-severing means, each in threaded position with said needles for application to the backing, and*

*bit-stop means at each threading station comprising a tubular member serving as an extension of the corresponding flow passage but of smaller cross-section to stop each bit in said position.*

*29. In a tufting machine for applying tuft bits to a backing, the combination of*

*threading stations adjacent one side of the backing,*

*tufting needles, and means for passing said tufting needles through the backing to and from the respective threading stations,*

*strand-severing means for severing bits from strands of tufting material,*

*pneumatic means including flow passages extending from said strand-severing means to said threading stations respectively for propelling the severed bits from said strand-severing means into threaded relationship with said tufting needles, each to position for its application to the backing,*

*bit-stop means for each threading station comprising a member movable in the corresponding flow passage, and*

*cam means for controlling the position of said movable bit-stop means.*

*30. A tufting machine comprising*

*tufting needle means,*

*means having a common outlet passage and having a plurality of communicating yarn-inlet passages for supplying yarn via said common outlet passage to said needle means when in said threading position,*

*means for moving said tufting needle means from a threading position to a tuft-applying position,*

*a group of yarn selectors providing for supply of a selected yarn to a corresponding inlet passage and including a plurality of yarn-restraining means,*

*means for selectively operating said yarn-restraining means to release said selected one of the yarns,*

*pneumatic means providing for flow of air to move the selected yarn a bit-length toward and into threaded relation with said needle means, and*

*means disposed in the path of said yarn for severing therefrom said bit-lengths.*

*31. In a tufting machine for forming tufts on a backing, the combination of*

*tufting means including threadable tufting elements,*

*means for passing said tufting means through the backing toward and from a loading position,*

*pneumatic means for transporting tufting material toward said tufting means repeatedly to thread said tufting means when in said loading position,*

*severing means repeatedly for cutting lengths from said tufting material for the tufting of said backing, and*

*timing means associated with said tufting means and said severing means providing for the respective threading of said tufting means while in said loading position.*

*32. In a tufting machine for forming tufts on a backing,*

*tufting needle means,*

*means for passing said tufting needle means through the backing toward and from a threading position,*

*strand-severing means for cutting bits from a strand of tufting material,*

*a multi-strand selector arrangement including means to release a selected strand and to restrain the remainder, and*

*means providing for flow of air to feed the selected strand to said strand-severing means and to transport the successive bits from said strand-severing means to effect threading of the needle means while in said threading position.*

*33. In a tufting machine for forming tufts on a backing, the combination of*

*tufting needle means,*

*means for passing said tufting needle means through the backing toward and from a threading position,*

*means for cutting the tufting material into bit-lengths,*

*means for feeding said tufting material a bit-length beyond said cutting means, and*

*pneumatic means for threading said needle means, while in said threading position, with said bit-length of tufting material.*

*34. In a tufting machine for forming tufts on a backing,*

*tufting needle means,*

*means for passing said tufting needle means through the backing toward and from a threading position,*

*means for cutting into bits a strand of tufting material,*

*a multi-strand selector arrangement including means to release a selected strand and restrain the remainder,*

*means for feeding the selected strand beyond said cutting means by a bit-length thereof, and*

*pneumatic means for threading said needle means, while in said threading position, with said bit-lengths of the selected tufting material.*

*35. In a tufting machine for forming tufts on a backing, the combination of*

*tufting needle means,*

*means for moving said tufting needle means through the backing toward and from a threading position,*

*means for repeatedly threading said tufting needle means with tufting material upon successive movements of said tufting needle means to threading position,*

*severing means,*

*pneumatic means for feeding said tufting material to said severing means and to said tufting needle means, and*

*means for operating said severing means each time said needle means is in its threading position for application thereto of tufting material.*

*36. A tufting machine for applying tufting yarn to a backing comprising*

*loading stations adjacent the path of travel of said backing through said tufting machine,*

*yarn-applying elements for engaging and transferring tufting yarn from said stations to said backing,*

*supply spools for the tufting yarn,*

*means for arresting the yarn at said stations for transfer by said yarn-applying elements,*

*actuating means for actuating said yarn-applying elements toward and away from the path of travel of said backing,*

*means for receiving the ends of yarn strands fed from respective supply spools and having communicating means for discharging yarn into said loading stations and in the respective paths of said yarn-applying elements,*

*pneumatic means associated with said communicating means for transporting the yarn for tufting,*

*severing means disposed in advance of said loading stations, and*

*timer means for coordinating the operation of said severing means with said actuating means to cut tufting yarn from said strands transported to said loading station by said pneumatic means when said yarn-applying elements are in a position away from the path of travel of said backing.*

*37. A tufting machine as in claim 36 in which said arresting means comprises a plurality of yarn stops respectively in alignment with communicating means.*

*38. An apparatus for producing yarn bits of length to provide tufting, comprising*

*means for feeding yarn from a source of supply a bit length at a time,*

*a device having a passageway for receiving said yarn,*

*a reciprocable bit-applying element,*

*means for moving said bit-applying element across said passageway from a loading position to a bit-applying position,*

*pnueumatic means for moving said yarn a bit at a time transversely of said bit-applying element while in its said loading position, and*

*yarn-cutting means acting across said passageway to detach a yarn bit from said yarn.*

References Cited

The following references, cited by the Examiner, are of record in the patented file of this patent or the original patent.

UNITED STATES PATENTS

| | | | |
|---|---|---|---|
| 2,497,330 | 2/1950 | Smith | 156—435 |
| 2,539,180 | 1/1951 | Brinton | 139—7 |
| 2,556,068 | 6/1951 | Crawford | 112—79 |
| 2,588,130 | 3/1952 | Lemon et al. | 156—72 |
| 2,809,600 | 10/1957 | Robb et al. | 112—79 |
| 2,862,465 | 12/1958 | Card | 112—79.6 |
| 2,866,424 | 12/1958 | Masland II | 112—79.6 |
| 2,887,966 | 5/1959 | Felton | 112—79.5 |
| 2,987,019 | 6/1961 | Felton | 112—79 |
| 3,039,170 | 6/1962 | Marshall | 112—79X |
| 3,217,675 | 11/1965 | Short | 112—79 |

FOREIGN PATENTS

| | | | |
|---|---|---|---|
| 919,904 | 2/1963 | Great Britain | 112—79.5 |

OTHER REFERENCES 3,247,816, August 1966, Polevitzky.

3,263,631, August 1966, Freeman.

JAMES R. BOLER, Primary Examiner